United States Patent
Hatanaka et al.

(10) Patent No.: US 12,241,697 B2
(45) Date of Patent: Mar. 4, 2025

(54) HEAT EXCHANGER, METHOD OF PRODUCING HEAT EXCHANGER, AND METHOD OF CONFIRMING BLOCKAGE OF HEAT EXCHANGER

(71) Applicant: MITSUBISHI HEAVY INDUSTRIES, LTD., Tokyo (JP)

(72) Inventors: Masaya Hatanaka, Tokyo (JP); Hiroyuki Nakaharai, Tokyo (JP); Nobuhide Hara, Tokyo (JP); Yoichi Uefuji, Tokyo (JP); Shunsaku Eguchi, Tokyo (JP); Takuo Oda, Tokyo (JP); Koichi Tanimoto, Tokyo (JP); Masashi Kitamura, Tokyo (JP); Tanehiro Shinohara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 241 days.

(21) Appl. No.: 17/799,837

(22) PCT Filed: Feb. 24, 2021

(86) PCT No.: PCT/JP2021/006724
§ 371 (c)(1),
(2) Date: Aug. 15, 2022

(87) PCT Pub. No.: WO2021/172301
PCT Pub. Date: Sep. 2, 2021

(65) Prior Publication Data
US 2023/0079473 A1 Mar. 16, 2023

(30) Foreign Application Priority Data
Feb. 27, 2020 (JP) .................. 2020-031205

(51) Int. Cl.
*F28F 7/02* (2006.01)
*F28D 7/00* (2006.01)
(Continued)

(52) U.S. Cl.
CPC . *F28F 3/08* (2013.01); *F28F 9/26* (2013.01)

(58) Field of Classification Search
CPC ........ F28F 11/00; F28F 2265/16; F28F 1/025; F28F 3/04; F28F 3/048; F28F 13/02;
(Continued)

(56) References Cited

U.S. PATENT DOCUMENTS 5,465,785 A 11/1995 Adderley et al.
6,302,402 B1 * 10/2001 Rynders .................. F28F 21/04
277/653
(Continued)

FOREIGN PATENT DOCUMENTS

JP 63-54970 U 4/1988
JP 6-505088 A 6/1994
(Continued)

OTHER PUBLICATIONS

International Preliminary Report on Patentability and Written Opinion of the International Searching Authority for International Application No. PCT/JP2021/006724, dated Sep. 9, 2022, with an English translation.
(Continued)

*Primary Examiner* — Frantz F Jules
*Assistant Examiner* — Jason N Thompson
(74) *Attorney, Agent, or Firm* — Birch, Stewart, Kolasch & Birch, LLP

(57) ABSTRACT

A heat exchanger for heat exchange between a first fluid and a second fluid is provided with: a body part which is an additive manufactured body and includes a first passage through which the first fluid flows and a second passage
(Continued)

through which the second fluid flows; and a covering part attached to the body part. The body part has a first opening portion of the first passage and a second opening portion of the second passage, and the covering part is attached to the body part so as to cover exposure of the first opening portion and the second opening portion.

15 Claims, 24 Drawing Sheets

(51) Int. Cl.
*F28F 3/08* (2006.01)
*F28F 9/02* (2006.01)
*F28F 9/26* (2006.01)

(58) Field of Classification Search
CPC .. F28F 13/06; F28F 13/08; F28F 13/12; F28F 1/003; F28F 2009/004; F28F 9/0219; F28F 9/0221; F28F 9/0224; F28F 9/0226; F28F 2280/06; F28D 7/0008; F28D 7/0025; F28D 1/0443; F28D 7/16; F28D 7/163; F28D 7/1653; F28D 9/0037
See application file for complete search history.

(56) References Cited

U.S. PATENT DOCUMENTS

| | | | | |
|---|---|---|---|---|
| 8,985,192 | B2* | 3/2015 | Mitsuhashi | F28D 9/0093 |
| | | | | 165/165 |
| 2002/0036078 | A1* | 3/2002 | Janezich | F28F 9/0229 |
| | | | | 165/164 |
| 2002/0162648 | A1* | 11/2002 | Crook | F02B 29/0456 |
| | | | | 165/173 |
| 2003/0031828 | A1 | 2/2003 | Kosty et al. | |
| 2004/0261379 | A1* | 12/2004 | Bruun | F28F 7/02 |
| | | | | 55/418 |
| 2005/0140097 | A1 | 6/2005 | Kosty et al. | |
| 2007/0121294 | A1* | 5/2007 | Campbell | F28F 9/007 |
| | | | | 165/80.4 |
| 2011/0056652 | A1* | 3/2011 | Neher | F28F 9/0241 |
| | | | | 164/47 |
| 2012/0325449 | A1* | 12/2012 | Okamoto | C08K 5/5435 |
| | | | | 165/173 |
| 2013/0264031 | A1* | 10/2013 | Plourde | F28F 1/022 |
| | | | | 165/104.11 |
| 2017/0304964 | A1 | 10/2017 | Andersen et al. | |
| 2017/0350660 | A1* | 12/2017 | Kalsi | F28F 7/02 |
| 2018/0045471 | A1 | 2/2018 | Dietrich | |
| 2018/0051941 | A1* | 2/2018 | Army | F28F 9/002 |
| 2018/0073813 | A1* | 3/2018 | Ranjan | F28F 7/02 |
| 2018/0195806 | A1* | 7/2018 | Czyz | F28F 9/0256 |
| 2018/0245854 | A1* | 8/2018 | Sabo | F28F 13/12 |
| 2019/0154345 | A1 | 5/2019 | Martinez et al. | |
| 2019/0219345 | A1* | 7/2019 | Wilson | F28F 21/084 |
| 2022/0290924 | A1 | 9/2022 | Eguchi et al. | |

FOREIGN PATENT DOCUMENTS

| | | | |
|---|---|---|---|
| JP | 2000-154978 | A | 6/2000 |
| JP | 2001-91185 | A | 4/2001 |
| JP | 3406896 | B2 | 5/2003 |
| JP | 2005-500482 | A | 1/2005 |
| JP | 4346728 | B2 | 10/2009 |
| JP | 2018-511767 | A | 4/2018 |
| JP | 2019-95186 | A | 6/2019 |
| JP | 2021-38894 | A | 3/2021 |

OTHER PUBLICATIONS

International Search Report for International Application No. PCT/JP2021/006724, dated May 11, 2021.

* cited by examiner

HEAT EXCHANGER, METHOD OF PRODUCING HEAT EXCHANGER, AND METHOD OF CONFIRMING BLOCKAGE OF HEAT EXCHANGER

TECHNICAL FIELD

The present disclosure relates to a heat exchanger, a method of producing a heat exchanger, and a method of confirming blockage of a heat exchanger.

BACKGROUND

Heat exchangers are used in various devices, plants, etc., for the purpose of heating or cooling fluids. There are various types of heat exchangers; for example, a heat exchanger in which a heat exchanger core composed of a laminate of plates is housed inside a cylindrical casing is known (Patent Document 1).

CITATION LIST

Patent Literature

Patent Document 1: JP3406896B

SUMMARY

Problems to be Solved

However, when a heat exchanger core is formed by stacking plates as in Patent Document 1, the shape of the heat exchanger core is inevitably restricted. In response to this, in recent years, a heat exchanger is manufactured by three-dimensional additive manufacturing (additive manufacturing), in which a product is formed by depositing metal layer by layer. The three-dimensional additive manufacturing can significantly reduce the constraints on the shape of the heat exchanger core. Since the heat exchanger contains many fine structures and thin-walled structures, three-dimensional additive manufacturing with the powder bed method is suitable for forming the heat exchanger. In this method, it is necessary to remove excess metal powder remaining inside the heat exchanger after forming the heat exchanger.

For example, when trying to remove metal powder remaining in passages for a fluid flowing through the heat exchanger, since each passage does not usually open directly to the outside of the heat exchanger, the metal powder remaining in each passage is sent, for example, to a header passage that communicates with each passage, and the metal powder is dispensed through the opening of the header passage. In this way, when the heat exchanger is formed by three-dimensional additive manufacturing with the powder bed method, generally, it is possible that the metal powder is insufficiently extracted or remains inside the heat exchanger due to the necessity of ejecting the metal powder through a long passage, or a small opening for extracting the metal powder. Another problem is that, when blockage occurs in the passage in the use of the heat exchanger, maintenance work is difficult due to the configuration of the heat exchanger described above.

In view of the above problems, an object of at least one embodiment of the present disclosure is to provide a heat exchanger and a method of producing a heat exchanger whereby it is possible to easily remove a raw material remaining inside the heat exchanger in additive manufacturing, and a method of confirming blockage of a heat exchanger whereby it is possible to easily confirm internal blockage after the use of the heat exchanger.

Solution to the Problems

To achieve the above object, a heat exchanger according to the present disclosure for heat exchange between a first fluid and a second fluid is provided with: a body part which is an additive manufactured body and includes a first passage through which the first fluid flows and a second passage through which the second fluid flows; and a covering part attached to the body part. The body part has a first opening portion of the first passage and a second opening portion of the second passage, and the covering part is attached to the body part so as to cover exposure of the first opening portion and the second opening portion.

Further, a method of producing a heat exchanger according to the present disclosure includes, for producing a heat exchanger for heat exchange between a first fluid and a second fluid: a step of additive manufacturing with metal powder a body part which includes a first passage through which the first fluid flows and a second passage through which the second fluid flows and has a first opening portion of the first passage and a second opening portion of the second passage; a step of removing the metal powder remaining inside the body part through the first opening portion and the second opening portion, after the step of additive manufacturing the body part; and a step of attaching a covering part to the body part so as to cover exposure of the first opening portion and the second opening portion, after the step of removing the metal powder.

Advantageous Effects

With the heat exchanger of the present disclosure, although a raw material of additive manufacturing remains inside the first passage and the second passage after additive manufacturing the body part, since the first opening portion of the first passage and the second opening portion of the second passage are exposed, the remaining raw material can be easily removed through the first opening portion and the second opening portion. Further, since the first opening portion of the first passage and the second opening portion of the second passage are exposed by detaching the covering part from the body part after the use of the heat exchanger, the presence or absence of blockage in the first passage and the second passage can be easily confirmed.

With the method of producing a heat exchanger of the present disclosure, although the metal powder of additive manufacturing remains inside the first passage and the second passage after additive manufacturing the body part, since the first opening portion of the first passage and the second opening portion of the second passage are exposed, the remaining metal powder can be easily removed through the first opening portion and the second opening portion.

DETAILED DESCRIPTION

Hereinafter, a heat exchanger, an additive manufacturing method for the heat exchanger, and a method of confirming blockage of the heat exchanger according to embodiments of the present disclosure will be described with reference to the drawings. The embodiments each indicate one aspect of the present disclosure, do not intend to limit the disclosure, and can optionally be modified within a range of a technical idea of the present disclosure.

First Embodiment

<Configuration of Heat Exchanger According to First Embodiment of Present Disclosure>

Figure 1:
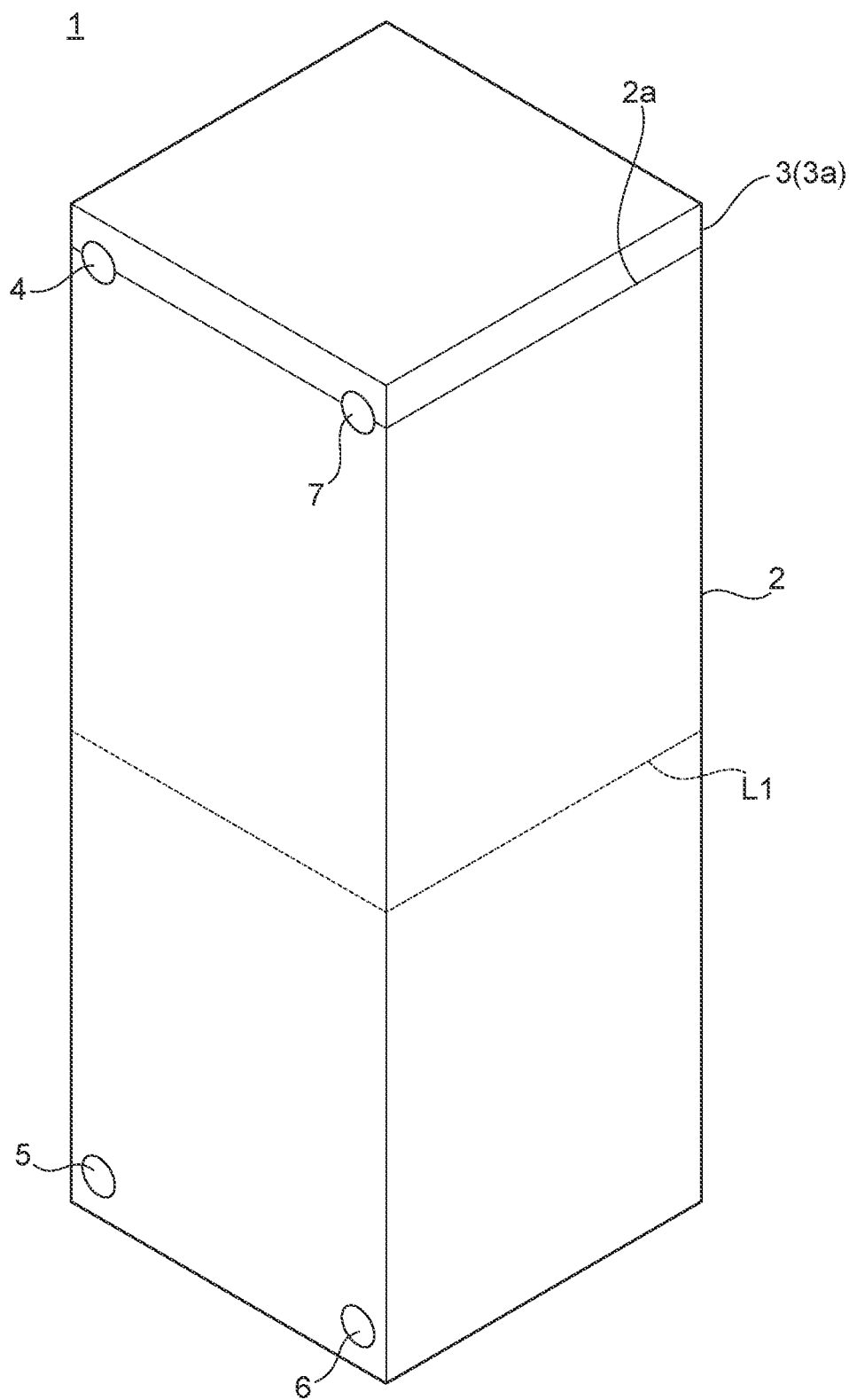
FIG. 1 is a perspective view of a heat exchanger according to at least one embodiment of the present disclosure.

As shown in FIG. 1, the heat exchanger 1 according to the first embodiment of the present disclosure is a heat exchanger for exchanging heat between a first fluid and a second fluid, and includes a body part 2 and a covering part 3 attached to the body part 2. The first fluid and the second fluid may each be a liquid or a gas, but the temperatures of both are usually different. Although not limited, the body part 2 can have a rectangular cuboid shape. In the case where the body part 2 has a rectangular cuboid shape, a rectangular lid member 3a, which is the covering part 3, is attached to one end of the body part 2 in the longitudinal direction. The covering part 3 may be detachably attached to the body part 2 by fastening with bolts or the like, or may be irreversibly attached by welding or with adhesive or the like.

Figure 2:
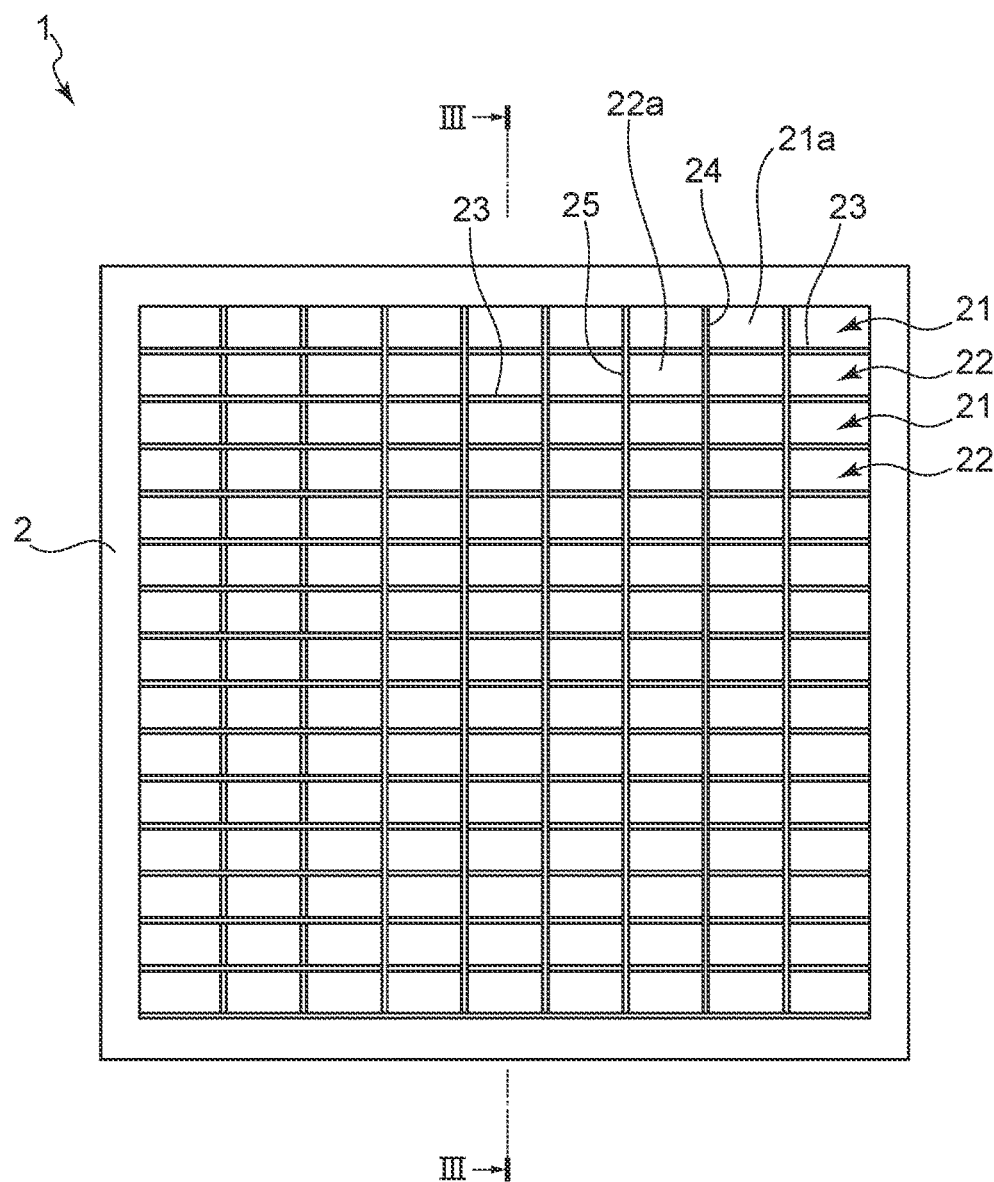
FIG. 2 is an end view of a cross-section cut along the dotted line L1 of FIG. 1.

As shown in FIG. 2, the body part 2 has first passages 21 through which the first fluid flows and second passages 22 through which the second fluid flows. The first passages 21 and the second passages 22 are each formed so as to extend along the longitudinal direction of the body part 2 (the direction perpendicular to the paper in FIG. 2). The first passages 21 and the second passages 22 are alternately arranged in the direction perpendicular to the longitudinal direction of the body part 2. The first passage 21 and the second passage 22 that are adjacent to each other are separated by a partition wall 23. The numbers of first passages 21 and second passages 22, that is, the number of partition walls 23 is not limited to the number shown in FIG. 2, and can be designed to any number.

Figure 3:
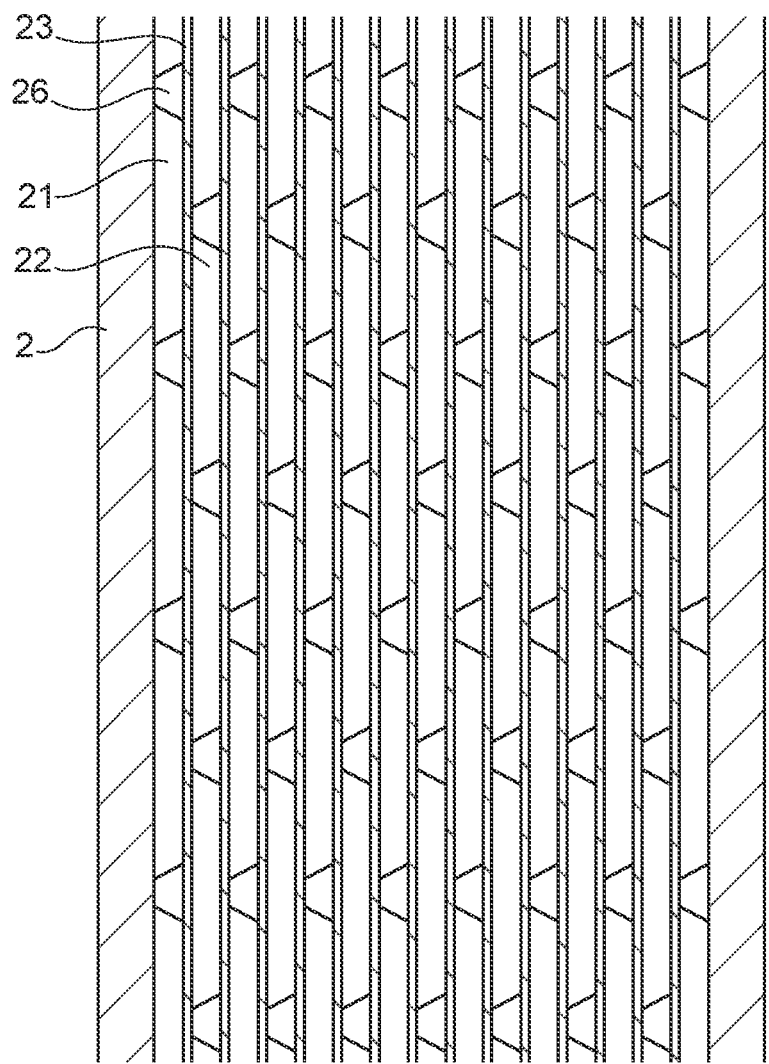
FIG. 3 is a cross-sectional view taken along line of FIG. 2.

Although not an essential configuration, each first passage 21 and each second passage 22 may be divided into a plurality of divided passages 21a and a plurality of divided passages 22a by a plurality of dividing walls 24, 25, respectively. In this case, the numbers of divided passages 21a and 22a, that is, the number of dividing walls 25 is not limited to the number shown in FIG. 2, and can be designed to any number. Although the configuration shown in FIG. 3 is also not essential, each first passage 21 and each second passage 22 may be provided with one or more ribs 26 so as to extend between adjacent partition walls 23, 23.

Figure 4:
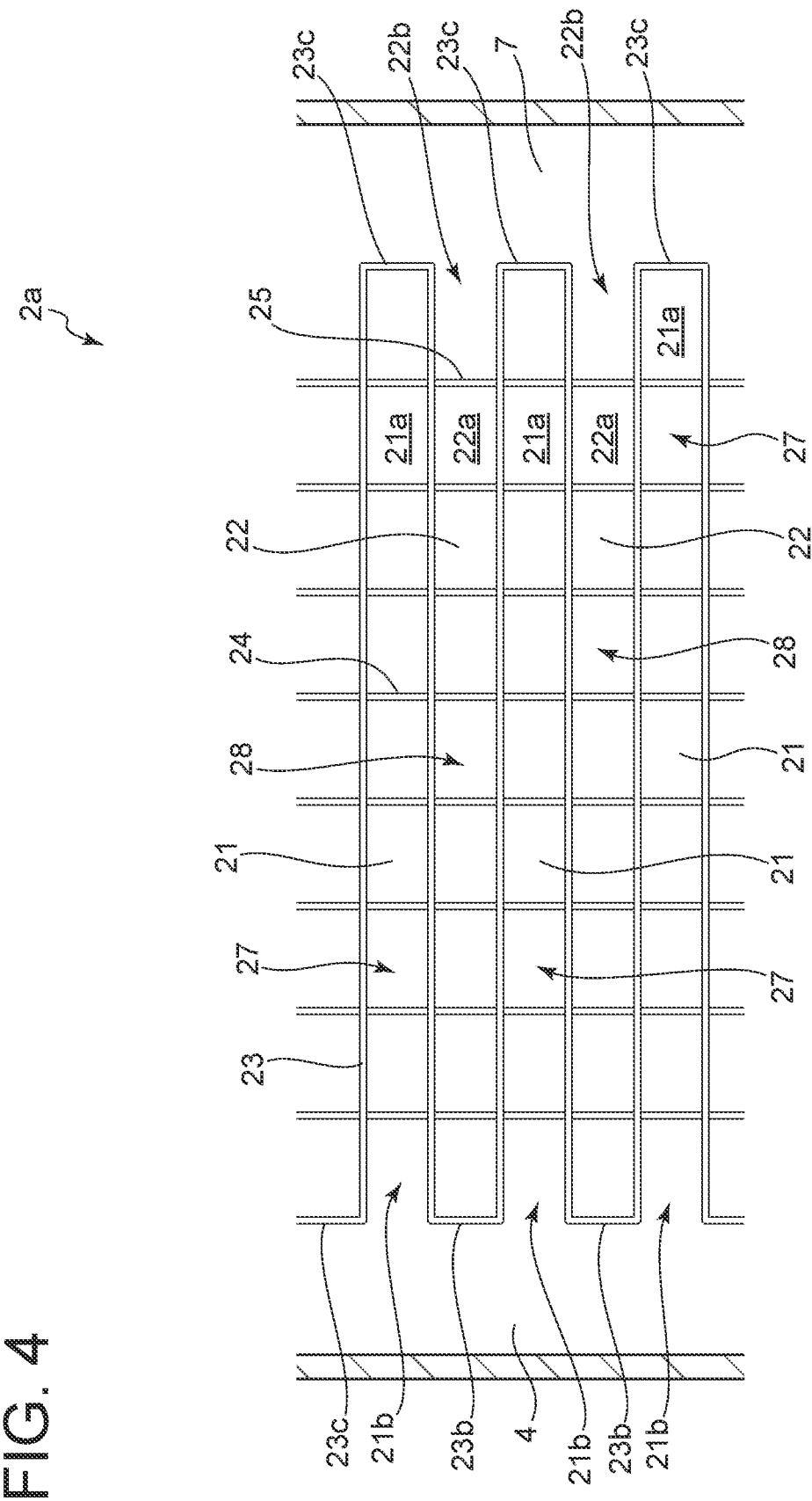
FIG. 4 is a plan view of a portion of an end surface of a body part when a covering part is detached from the heat exchanger of FIG. 1.

As shown in FIG. 4, a first opening portion 27 of each first passage 21 and a second opening portion 28 of each second passage 22 are formed on an end surface 2a at one end in the longitudinal direction of the body part 2. That is, when the lid member 3a (see FIG. 1) is not attached to the body part 2, the first opening portion 27 of each first passage 21 and the second opening portion 28 of each second passage 22 are exposed on the end surface 2a. When the lid member 3a is attached to the end surface 2a of the body part 2 so as to cover the first opening portion 27 and the second opening portion 28 (state in FIG. 1), the exposure of the first opening portion 27 and the second opening portion 28 is covered.

As shown in FIG. 1, the heat exchanger 1 includes a first header passage 4 for introducing the first fluid into each first passage 21 (see FIGS. 2 and 3), a first header passage 5 for collecting the first fluid after flowing through each first passage 21, a second header passage 6 for introducing the second fluid into each second passage 22 (see FIGS. 2 and 3), and a second header passage 7 for collecting the second fluid after flowing through each second passage 22. As will be discussed in detail for describing the heat exchange operation in the heat exchanger 1, the configuration of FIG. 1 is the case of countercurrent flow of the first fluid flowing through each first passage 21 and the second fluid flowing through each second passage 22. In the case of parallel flow of the first fluid and the second fluid, the positions of the first header passage 4 and the first header passage 5 are switched, or the positions of the second header passage 6 and the second header passage 7 are switched.

Figure 5:
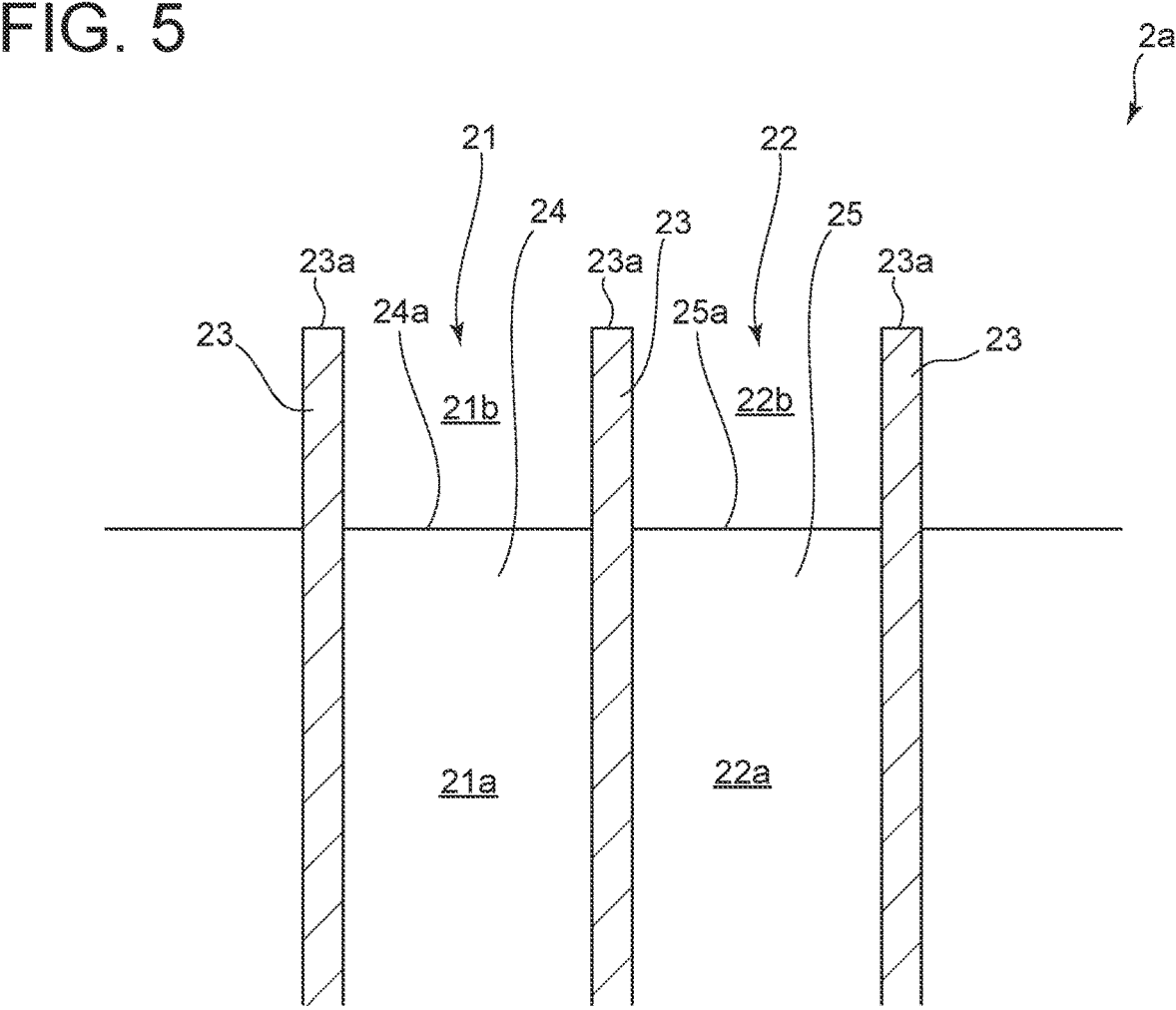
FIG. 5 is an enlarged cross-sectional view of a portion of an end surface at one end in the longitudinal direction of a body part of a heat exchanger according to at least one embodiment of the present disclosure.

As shown in FIG. 5, the respective end portions 24a, 25a of the dividing walls 24, 25 are located on the other end side of the body part 2 in the longitudinal direction (on the lower side in FIG. 5) relative to the end portion 23a of the partition wall 23. Accordingly, in the vicinity of the end surface 2a, each first passage 21 and each second passage 22 are not divided into a plurality of divided passages 21a and divided passages 22a by the dividing walls 24, 25 to form a first distribution passage 21b and a second distribution passage 22b communicating with the divided passages 21a and the divided passages 22a, respectively.

As shown in FIG. 4, each first distribution passage 21b communicates with the header passage 4, and each second distribution passage 22b communicates with the second header passage 7. Each second distribution passage 22b is sealed at the end adjacent to the first header passage 4 by a wall 23b connected to the two adjacent partition walls 23, 23 that defines the second passage 22, so that the second distribution passage 22b does not communicate with the first header passage 4. Each first distribution passage 21b is sealed at the end adjacent to the second header passage 7 by a wall 23c connected to the two adjacent partition walls 23, 23 that defines the first passage 21, so that the first distribution passage 21b does not communicate with the second header passage 7.

As well as the first header passage 4 communicates with the first passages 21, and the second header passage 7 communicates with the second passages 22, at the other end side of the body part 2 in the longitudinal direction, the first header passage 5 communicates with the first passages 21, and the second header passage 6 communicates with the second passages 22, but these configurations are not shown in FIGS. 1 to 5.

In the case of the configuration shown in FIG. 4 at one end side of the body part 2 in the longitudinal direction, when attaching the lid member 3a to the end surface 2a of the body part 2, it is necessary to form a seal between the first passage 21 and the second passage 22. When the lid member 3a is detachably attached to the end surface 2a of the body part 2, the above-described seal can be formed by, for example, placing a seal member such as a rubber plate or a liquid gasket between the lid member 3a and the end surface 2a, and fastening the lid member 3a to the body part 2 with a bolt. When the lid member 3a is irreversibly attached to the end surface 2a of the body part 2, the above-described seal can be formed by, for example, with the lid member 3a placed on the end surface 2a, irradiating the lid member 3a with laser from the outer surface side along the end portions 23a (see FIG. 5) of the partition walls 23 and the end portions of the walls 23b, 23c to join the back surface of the lid member 3a to the end portions 23a of the partition walls 23 and the end portions of the walls 23b, 23c. In addition, the above-described seal may be formed by applying a brazing material to the joint position between the lid member 3a and the end surface 2a of the body part 2 with the lid member 3a placed on the end surface 2a for brazing in a furnace, or bonding the lid member 3a to the end surface 2a of the body part 2 with adhesive.

<Heat Exchange Operation of Heat Exchanger According to First Embodiment of Present Disclosure>

Next, the heat exchange operation for exchanging heat between the first fluid and the second fluid in the heat exchanger 1 will be described. As shown in FIG. 1, the first fluid is supplied to the first header passage 4 and the second fluid is supplied to the second header passage 6. As shown in FIG. 4, at one end side in the longitudinal direction of the body part 2, the first fluid supplied to the first header passage 4 is introduced through the first distribution passage 21b into the divided passages 21a of each first passage 21. On the other hand, at the other end side in the longitudinal direction of the body part 2, the second fluid supplied to the second header passage 6 is introduced in the same way into the divided passages 22a of each second passage 22. The first fluid flowing through the first passage 21 and the second fluid flowing through the second passage 22 exchange heat via the partition wall 23. When the heat exchanger 1 has the configuration shown in FIG. 1, the flow directions of the first fluid and the second fluid are opposite in the longitudinal direction of the body part 2. However, the first fluid and the second fluid are not limited to flowing in countercurrent, but may flow in parallel.

When the first passage 21 and the second passage 22 are provided with the ribs 26, as the first fluid and the second fluid collide with the ribs 26 or flow so as to bypass the ribs 26, the flows of the first and second fluids are disrupted, so that the boundary layer which inhibits heat exchange is disrupted. This improves the heat exchange efficiency between the first fluid and the second fluid. Further, when the rib 26 is connected to both of the pair of partition walls 23, 23, it is possible to reduce the risk of deformation of the partition walls 23, i.e., the risk of narrowing of the flow passage.

At one end side in the longitudinal direction of the body part 2, after the second fluid flows through the second passages 22 and exchanges heat with the first fluid, the second fluid having passed through each second passage 22 is introduced and collected into the second header passage 7 through each second distribution passage 22b and is discharged from the heat exchanger 1. On the other hand, at the other end side in the longitudinal direction of the body part 2, after the first fluid flows through the first passages 21 and exchanges heat with the second fluid, the first fluid having passed through each first passage 21 is introduced and collected into the first header passage 5 in the same way and is discharged from the heat exchanger 1.

<Method of Producing Heat Exchanger According to First Embodiment of Present Disclosure>

The body part 2 of the heat exchanger 1 according to the first embodiment of the present disclosure is difficult to manufacture by laminating plates or casting due to the complexity of the structure. Therefore, it is preferable that the body part 2 is produced by additive manufacturing using metal powder as a raw material. In this case, the body part 2 is an additive manufactured body of metal powder. The metal powder used for additive manufacturing the body part 2 is not particularly limited, but powder of stainless steel or titanium may be used. On the other hand, since the structure of the lid member 3a is not as complicated as the body part 2, the lid member 3a may be produced by casting or the like, or may be produced by additive manufacturing with metal powder in the same way as the body part 2.

Next, the method of producing the heat exchanger 1 will be described based on the flowchart of FIG. 6. First, the body part 2 is additive manufactured on a base plate (step S1). Specifically, the metal powder is placed on the base plate, and the metal powder is irradiated with a laser or an electron beam to melt and solidify the necessary part. By further placing the metal powder thereon and repeating this operation, the body part 2 is additive manufactured. The stacking direction of the body part 2 is preferably a direction from the other end to one end of the body part 2 in the longitudinal direction (or vice versa), i.e., a direction of extension of the first passage 21 and the second passage 22. If the body part 2 is formed by stacking layers so that the extension direction of the first passage 21 and the second passage 22 is horizontal, the partition walls 23 become overhangs, and a support for supporting the overhangs must be provided in a wide range. In this case, considering the complexity of the structure of the body part 2, it is practically impossible to remove the support, and it is practically impossible to produce the body part 2 by additive manufacturing.

The passage width of the first passage 21 and the second passage 22, i.e., the distance between the adjacent partition walls 23, 23 is preferably 3 mm or less, more preferably about 1 mm. It is empirically known that additive manufacturing is possible without a support when the overhang has a length of 3 mm or less. When the first passage 21 and the second passage 22 are provided with the ribs 26 as shown in FIG. 3, the ribs 26 become overhangs, but if the passage width of the first passage 21 and the second passage 22 is within this range, since the length of the ribs 26 is 3 mm or less, the ribs 26 can be formed by additive manufacturing without a support.

After additive manufacturing the body part 2 on the base plate, the body part 2 is separated from the base plate (step S2). Metal powder that has not melted and solidified remains inside the body part 2 additive manufactured with the metal powder, for example, in the first passage 21 and the second passage 22. Then, after step S2, the metal powder remaining inside the body part 2 is removed (step S3).

As described above, the first opening portion 27 of each first passage 21 and the second opening portion 28 of each second passage 22 are formed on the end surface 2a at one end in the longitudinal direction of the body part 2 additive manufactured in steps S1 and S2. Therefore, the metal powder remaining in the first passage 21 and the second passage 22 can be easily removed by shaking the body with the first opening portion 27 and the second opening portion 28 facing vertically downward, or by suctioning the interior of the first passage 21 and the second passage 22 through the first opening portion 27 and the second opening portion 28, or by flowing a fluid through the first passage 21 and the second passage 22.

Although not an essential step, after step S3, it may be confirmed whether the metal powder still remains in the first passage 21 and the second passage 22, for example, by illuminating the interior of the first passage 21 and the second passage 22 or inserting a fiberscope thereinto through the first opening portion 27 and the second opening portion 28 (step S4). If the remaining metal powder is confirmed, the process returns to step S3.

After the completion of step S3, or as needed after confirming that no metal powder remains in step S4, the lid member 3a is attached to the body part 2 so as to cover the first opening portion 27 and the second opening portion 28, i.e., so as to cover the end surface 2a (step S5).

Thus, although the metal powder of additive manufacturing remains inside the first passage 21 and the second passage 22 after additive manufacturing the body part 2, since the first opening portion 27 of the first passage 21 and the second opening portion 28 of the second passage 22 are exposed, the remaining metal powder can be easily removed through the first opening portion 27 and the second opening portion 28.

<Method of Confirming Blockage after Use of Heat Exchanger According to First Embodiment of Present Disclosure>

If the lid member 3a is detachably attached to the body part 2, it is possible to confirm the presence or absence of blockage in the first passage 21 and the second passage 22 after the use of the heat exchanger 1. The method of confirming blockage after the use of the heat exchanger 1 will be described based on the flowchart of FIG. 7.

After using the heat exchanger 1, the lid member 3a is detached from the body part 2 (step S11). Then, a blocked portion inside the first passage 21 and the second passage 22 is identified through the first opening portion 27 and the second opening portion 28 (step S12). Specifically, by illuminating the interior of the first passage 21 and the second passage 22 or inserting a fiberscope thereinto through the first opening portion 27 and the second opening portion 28, it is confirmed whether there is a blockage in each first passage 21 and each second passage 22, and the blocked portion is identified.

Once the blocked portion is identified, the blockage is removed as necessary (step S13). If there are few blockages or no blockage, step S13 may be skipped. After the completion of step S13, or if step S13 is skipped, the lid member 3a is attached to the body part 2 (step S14).

Thus, since the first opening portion 27 of the first passage 21 and the second opening portion 28 of the second passage 22 are exposed by detaching the lid member 3a from the body part 2 after the use of the heat exchanger 1, the presence or absence of blockage in the first passage 21 and the second passage 22 can be easily confirmed.

Second Embodiment

Next, a heat exchanger according to the second embodiment will be described. The heat exchanger according to the second embodiment is modified from the first embodiment in the configuration of the body part 2. In the second embodiment, the same constituent element as those in the first embodiment are associated with the same reference numerals and not described again in detail.

<Configuration and Heat Exchange Operation of Heat Exchanger According to Second Embodiment of Present Disclosure>

Figure 8:
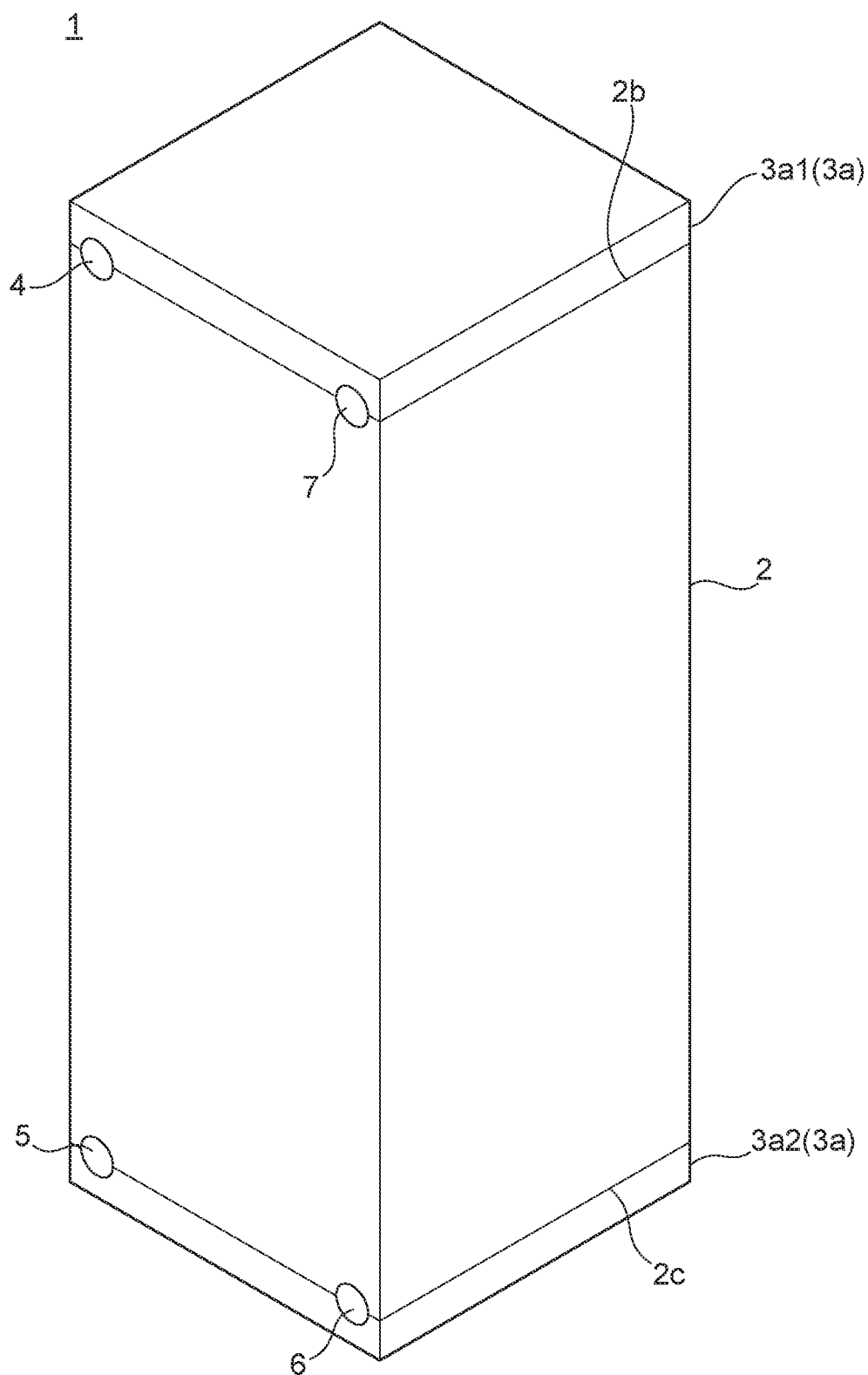
FIG. 8 is a perspective view of a heat exchanger according to at least one embodiment of the present disclosure.

As shown in FIG. 8, in the heat exchanger 1 according to the second embodiment of the present disclosure, the lid member 3a includes a first lid 3a1 attached to the body part 2 so as to cover a first end surface 2b at one end side in the longitudinal direction of the body part 2, and a second lid 3a2 attached to the body part 2 so as to cover a second end surface 2c at the other end side in the longitudinal direction of the body part 2. The configuration is otherwise the same as that of the first embodiment. Further, the heat exchange operation in the heat exchanger 1 according to the second embodiment is also the same as the heat exchange operation in the heat exchanger 1 according to the first embodiment.

<Method of Producing Heat Exchanger According to Second Embodiment of Present Disclosure>

The method of producing the heat exchanger 1 according to the second embodiment is basically the same as the method of producing the heat exchanger 1 according to the first embodiment. The second embodiment differs from the first embodiment in that two lid members 3a, namely, the first lid 3a1 and the second lid 3a2 are attached to the body part 2 so as to cover the first end surface 2b and the second end surface 2c of the body part 2, respectively. In the second embodiment, since the first opening portion 27 and the second opening portion 28 are exposed by detaching each of the first lid 3a1 and the second lid 3a2 from the body part 2, similarly, the metal powder remaining in the first passage 21 and the second passage 22 can be easily removed through the first opening portion 27 and the second opening portion 28.

<Method of Confirming Blockage after Use of Heat Exchanger According to Second Embodiment of Present Disclosure>

The method of confirming blockage after the use of the heat exchanger 1 according to the second embodiment is basically the same as the method of confirming blockage after the use of the heat exchanger 1 according to the first embodiment. The second embodiment differs from the first embodiment in that two lid members 3a, namely, the first lid 3a1 and the second lid 3a2 can be individually detached from the body part 2. Thus, in the second embodiment, since the first opening portion 27 of the first passage 21 and the second opening portion 28 of the second passage 22 are exposed by detaching the first lid 3a1 and the second lid 3a2 from the body part 2 after the use of the heat exchanger 1, the presence or absence of blockage in the first passage 21 and the second passage 22 can be easily confirmed.

In the second embodiment, by detaching each of the first lid 3a1 and the second lid 3a2 from the body part 2, respective both ends of the first passage 21 and the second passage 22 open to the first end surface 2b and the second end surface 2c. Then, if there is no metal powder or blockage in the first passage 21 and the second passage 22, light passes through the first passage 21 and the second passage 22, whereas if there is metal powder or blockage in the first passage 21 and the second passage 22, light does not pass through the first passage 21 and the second passage 22, which makes it possible to easily confirm the presence or absence of blockage or the necessity of removal of the metal powder.

Third Embodiment

Next, a heat exchanger according to the third embodiment will be described. The heat exchanger according to the third embodiment is modified from the second embodiment in the configuration of the body part 2 in the vicinity of the first end surface 2b and the second end surface 2c. In the third embodiment, the same constituent elements as those in the second embodiment are associated with the same reference numerals and not described again in detail.

<Configuration of Heat Exchanger According to Third Embodiment of Present Disclosure>

Figure 9:
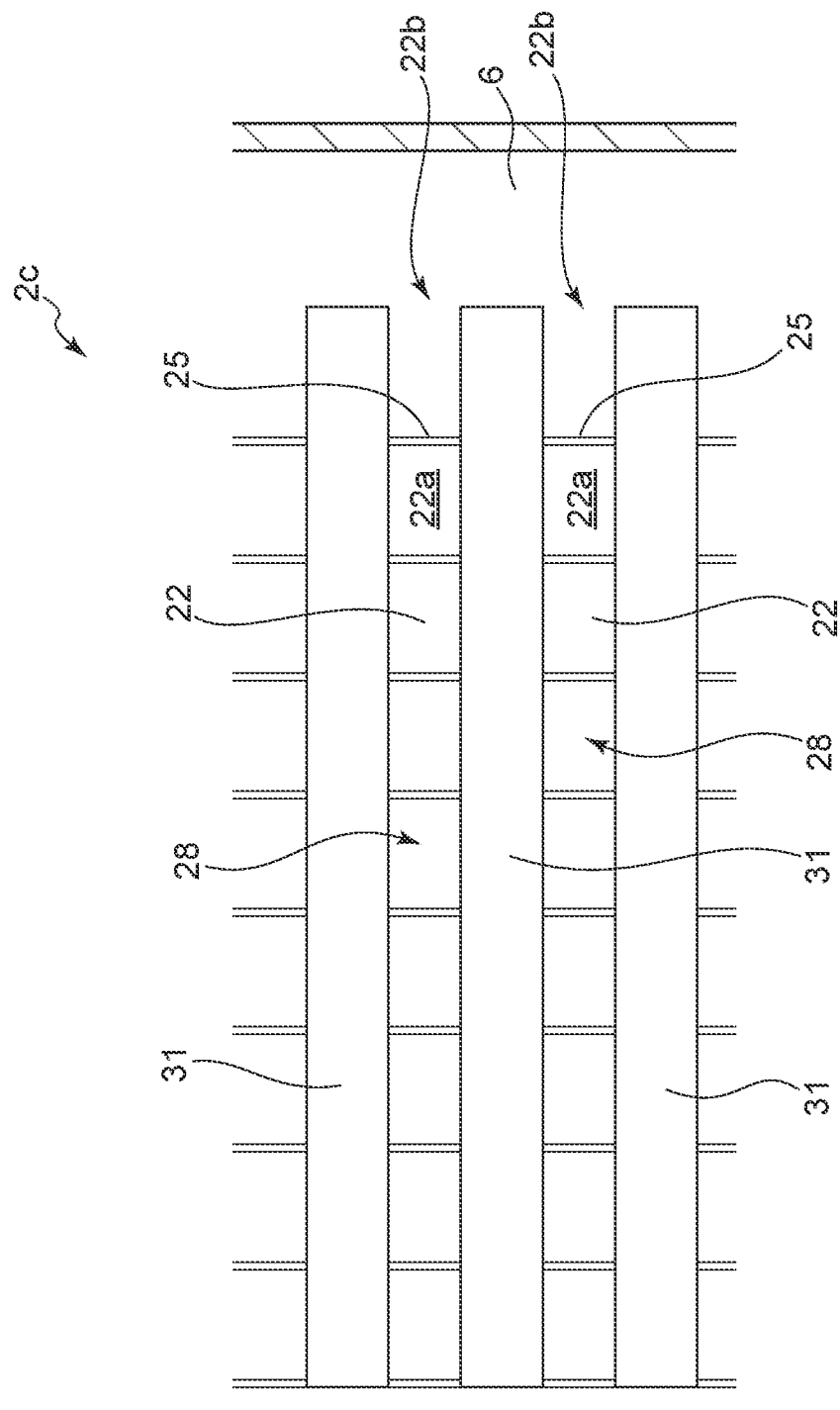
FIG. 9 is a plan view of a portion of a first end surface of a body part when a first lid is detached from a heat exchanger according to at least one embodiment of the present disclosure.
Figure 10:
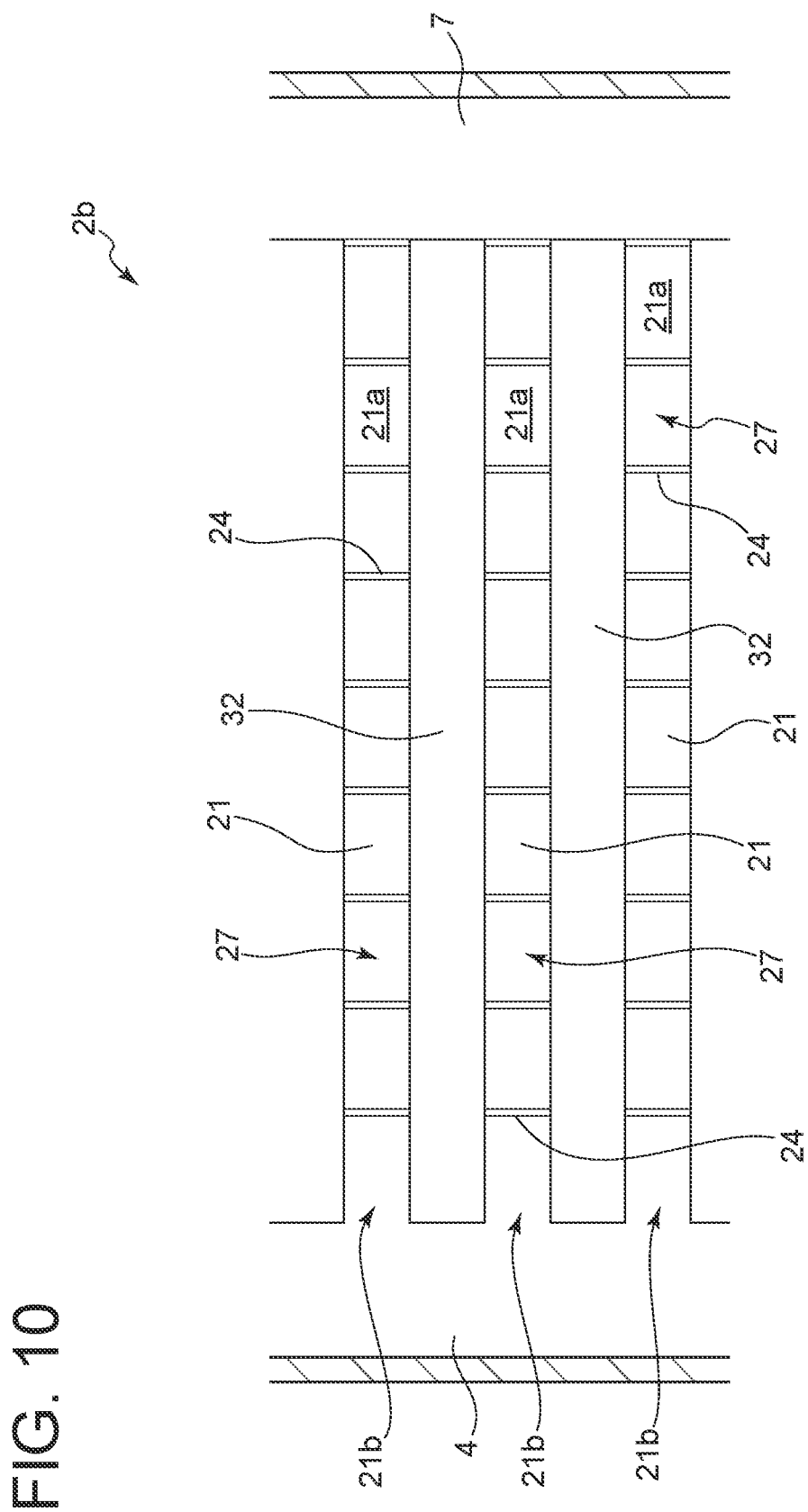
FIG. 10 is a plan view of a portion of a second end surface of a body part when a second lid is detached from a heat exchanger according to at least one embodiment of the present disclosure.

As shown in FIG. 9, on the second end surface 2c, a first closing wall 31 for closing the end portion of the first passage 21 is disposed between each adjacent second opening portions 28, 28. Accordingly, on the second end surface 2c, only the second opening portions 28 open. As shown in FIG. 10, on the first end surface 2b, a second closing wall 32 for closing the end portion of the second passage 22 is disposed between each adjacent first opening portions 27, 27. Accordingly, on the first end surface 2b, only the first opening portions 27 open. Thus, in the heat exchanger 1 according to the third embodiment, the first opening portion 27 is exposed on the first end surface 2b, while the second opening portion 28 is exposed on the second end surface 2c. The configuration is otherwise the same as that of the second embodiment.

<Heat Exchange Operation of Heat Exchanger According to Third Embodiment of Present Disclosure>

The heat exchange operation in the heat exchanger 1 according to the third embodiment is the same as the heat exchange operation in the heat exchanger 1 according to the second embodiment. In the third embodiment, even if the seal between the first lid 3a1 and the body part 2 is incomplete on the first end surface 2b, the second closing wall 32 prevents the second fluid from leaking from the second passage 22, so that only leakage of the first fluid through the first opening portion 27 can result from the incomplete seal. On the other hand, even if the seal between the second lid 3a2 and the body part 2 is incomplete on the second end surface 2c, the first closing wall 31 prevents the first fluid from leaking from the first passage 21, so that only leakage of the second fluid through the second opening portion 28 can result from the incomplete seal. Therefore, when the seal between the first lid 3a1 or the second lid 3a2 and the body part 2 is incomplete and a leak occurs, on both the first end surface 2b and the second end surface 2c, it is possible to prevent mixing of the first fluid and the second fluid.

<Method of Confirming Blockage after Use of Heat Exchanger According to Third Embodiment of Present Disclosure>

The method of producing the heat exchanger 1 according to the third embodiment is basically the same as the method of producing the heat exchanger 1 according to the second embodiment. When additive manufacturing the body part 2, one of the first closing wall 31 or the second closing wall 32 becomes an overhang, but if the passage width of the first passage 21 and the second passage 22 is 3 mm or less, the first closing wall 31 or the second closing wall 32 can be formed by additive manufacturing without a support. Further, the method of confirming blockage after the use of the heat exchanger 1 according to the third embodiment is basically the same as the method of confirming blockage after the use of the heat exchanger 1 according to the second embodiment.

Fourth Embodiment

Next, a heat exchanger according to the fourth embodiment will be described. The heat exchanger according to the fourth embodiment is modified from the first embodiment in the configuration of the covering part 3. In the fourth embodiment, the same constituent elements as those in the first embodiment are associated with the same reference numerals and not described again in detail.

<Configuration of Heat Exchanger According to Fourth Embodiment of Present Disclosure>

Figure 11:
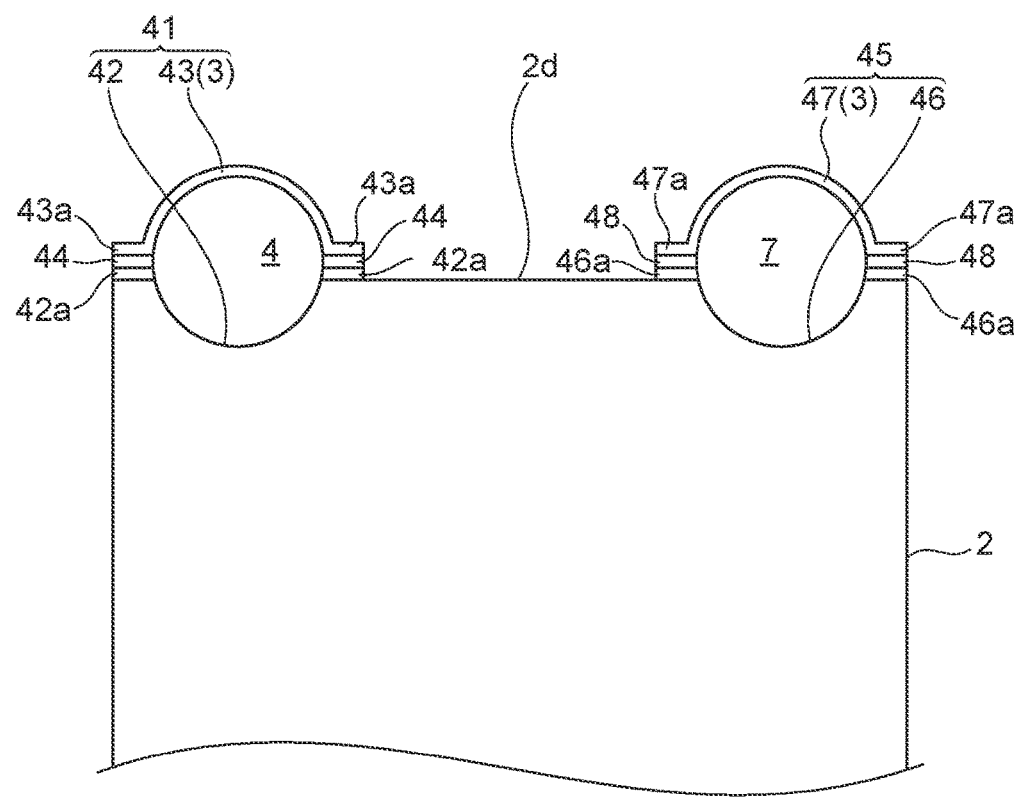
FIG. 11 is an exploded perspective view of a portion of one end side of a heat exchanger according to at least one embodiment of the present disclosure.

As shown in FIG. 11, in the heat exchanger 1 according to the fourth embodiment of the present disclosure, a first header passage wall 41 defining the first header passage 4 has a first fixed wall 42 fixed to the body part 2 and a first separation wall 43 attached to the first fixed wall 42. The first fixed wall 42 and the first separation wall 43 are provided with flange portions 42a and 43a, respectively, and the first separation wall 43 can be attached to the first fixed wall 42 with a seal member 44 being interposed between the flange portion 42a and the flange portion 43a. The arrangement positions of the flange portions 42a and 43a are not particularly limited. For example, as shown in FIG. 11, the flange portion 42a may be arranged on an upper end surface 2d of the body part 2. The first separation wall 43 may be detachably attached to the first fixed wall 42 by fastening with bolts or the like, or may be irreversibly attached by welding or with adhesive or the like.

Figure 12:
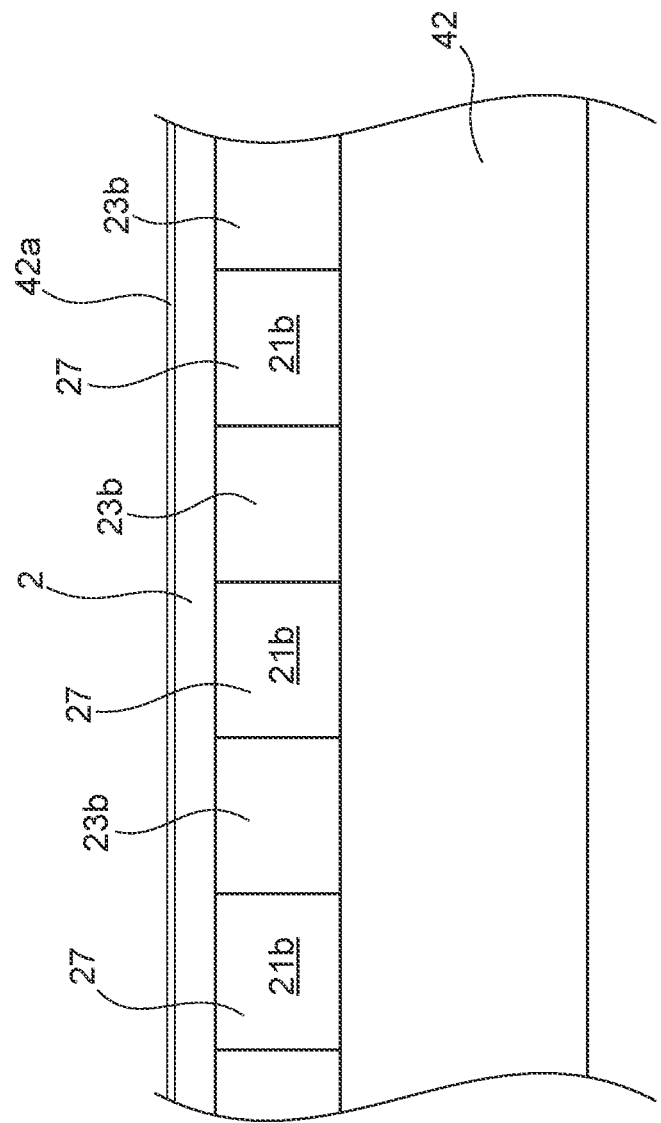
FIG. 12 is a diagram of a first opening portion of a heat exchanger according to at least one embodiment of the present disclosure.

As described in the first embodiment, the first passage 21 (see FIGS. 2 to 5) communicates with the first header passage 4 via the first distribution passage 21b (see FIGS. 4 and 5). Accordingly, as shown in FIG. 12, the first opening portion 27 is an opening portion of the first distribution passage 21b in the first fixed wall 42. As shown in FIG. 11, when the first separation wall 43 is detached from the first fixed wall 42, the first opening portion 27 is exposed in the first fixed wall 42. On the other hand, when the first separation wall 43 is attached to the first fixed wall 42, the exposure of the first opening portion 27 is covered by the first separation wall 43. Thus, the first separation wall 43 constitutes the covering part 3. Although not shown in FIG. 11, the first header passage wall defining the first header passage 5 has the same configuration.

A second header passage wall 45 defining the second header passage 7 has a second fixed wall 46 fixed to the body part 2 and a second separation wall 47 attached to the second fixed wall 46. The second fixed wall 46 and the second separation wall 47 are provided with flange portions 46a and 47a, respectively, and the second separation wall 47 can be attached to the second fixed wall 46 with a seal member 48 being interposed between the flange portion 46a and the flange portion 47a. The arrangement positions of the flange portions 46a and 47a are not particularly limited. For example, as shown in FIG. 11, the flange portion 46a may be arranged on an upper end surface 2d of the body part 2. The second separation wall 47 may be detachably attached to the second fixed wall 46, or may be irreversibly attached by welding or with adhesive or the like.

Figure 13:
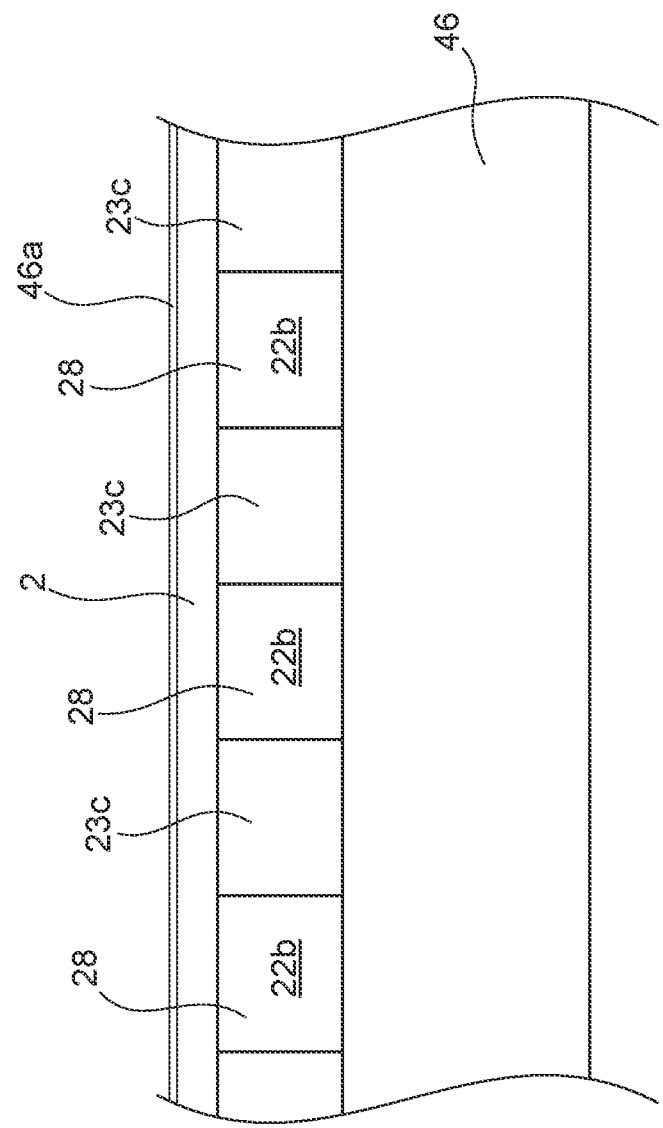
FIG. 13 is a diagram of a second opening portion of a heat exchanger according to at least one embodiment of the present disclosure.

As described in the first embodiment, the second passage 22 (see FIGS. 2 to 5) communicates with the second header passage 7 via the second distribution passage 22b (see FIGS. 4 and 5). Accordingly, as shown in FIG. 13, the second opening portion 28 is an opening portion of the second distribution passage 22b in the second fixed wall 46. As shown in FIG. 11, when the second separation wall 47 is detached from the second fixed wall 46, the second opening portion 28 is exposed in the second fixed wall 46. On the other hand, when the second separation wall 47 is attached to the second fixed wall 46, the exposure of the second opening portion 28 is covered by the second separation wall 47. Thus, the second separation wall 47 constitutes the covering part 3. Although not shown in FIG. 11, the second header passage wall defining the second header passage 6 has the same configuration.

<Heat Exchange Operation of Heat Exchanger According to Fourth Embodiment of Present Disclosure>

In a state where the first separation wall 43 and the second separation wall 47 are attached to the first fixed wall 42 and the second fixed wall 46, respectively, the heat exchanger 1 according to the fourth embodiment has the same configuration as the heat exchanger 1 according to the first embodiment, so that the heat exchange operation in the heat exchanger 1 according to the fourth embodiment is the same as the heat exchange operation in the heat exchanger 1 according to the first embodiment.

<Method of Producing Heat Exchanger According to Fourth Embodiment of Present Disclosure>

The method of producing the heat exchanger 1 according to the fourth embodiment is basically the same as the method of producing the heat exchanger 1 according to the first embodiment. The fourth embodiment differs from the first embodiment in that, since the covering part 3 is composed of the first separation wall 43 and the second separation wall 47, the removal of the metal powder in step S3 and the confirmation of the residual metal powder in step S4 of the flowchart of FIG. 6 are performed through the first opening portion 27 and the second opening portion 28 opening in the first fixed wall 42 and the second fixed wall 46, respectively. However, in the fourth embodiment, since the first opening portion 27 and the second opening portion 28 are exposed when the first separation wall 43 and the second separation wall 47 are not attached to the first fixed wall 42 and the second fixed wall 46, similarly, the metal powder remaining in the first passage 21 and the second passage 22 can be easily removed.

<Method of Confirming Blockage after Use of Heat Exchanger According to Fourth Embodiment of Present Disclosure>

Figure 7:
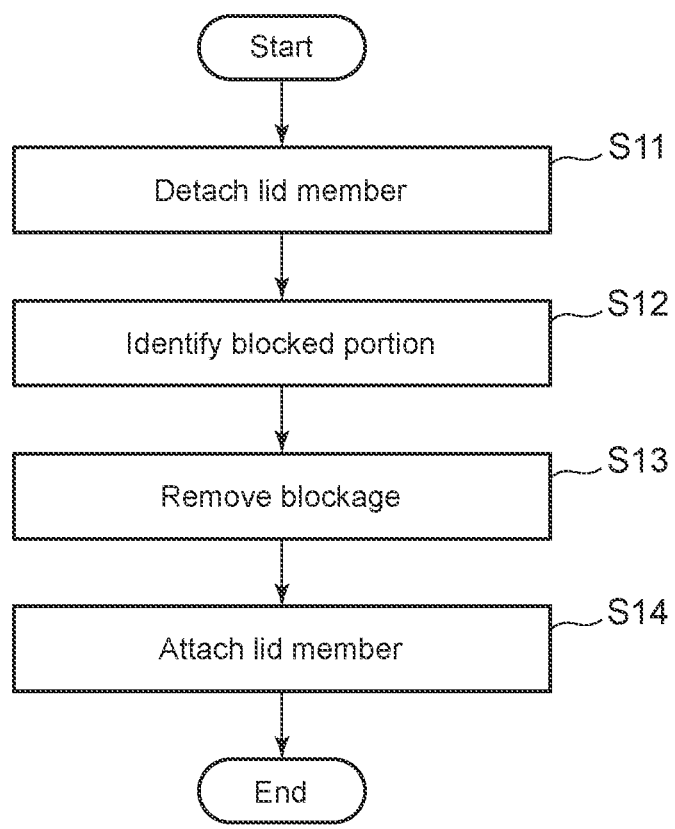
FIG. 7 is a flowchart of a method of confirming blockage after the use of a heat exchanger according to at least one embodiment of the present disclosure.

The method of confirming blockage after the use of the heat exchanger 1 according to the fourth embodiment is basically the same as the method of confirming blockage after the use of the heat exchanger 1 according to the first embodiment. The fourth embodiment differs from the first embodiment in that, since the covering part 3 is composed of the first separation wall 43 and the second separation wall 47, the identification of the blocked portion in step S12 and the removal of blockage in step S13 of the flowchart of FIG. 7 are performed through the first opening portion 27 and the second opening portion 28 opening in the first fixed wall 42 and the second fixed wall 46, respectively. However, in the fourth embodiment, since the first opening portion 27 and the second opening portion 28 are exposed when the first separation wall 43 and the second separation wall 47 are not attached to the first fixed wall 42 and the second fixed wall 46, respectively, the presence or absence of blockage in the first passage 21 and the second passage 22 can be easily confirmed.

Fifth Embodiment

Next, a heat exchanger according to the fifth embodiment will be described. The heat exchanger according to the fifth embodiment is modified from the fourth embodiment to a cartridge configuration in which the body part 2 is inserted into a housing part. In the fifth embodiment, the same constituent elements as those in the fourth embodiment are associated with the same reference numerals and not described again in detail.

<Configuration of Heat Exchanger According to Fifth Embodiment of Present Disclosure>

Figure 14:
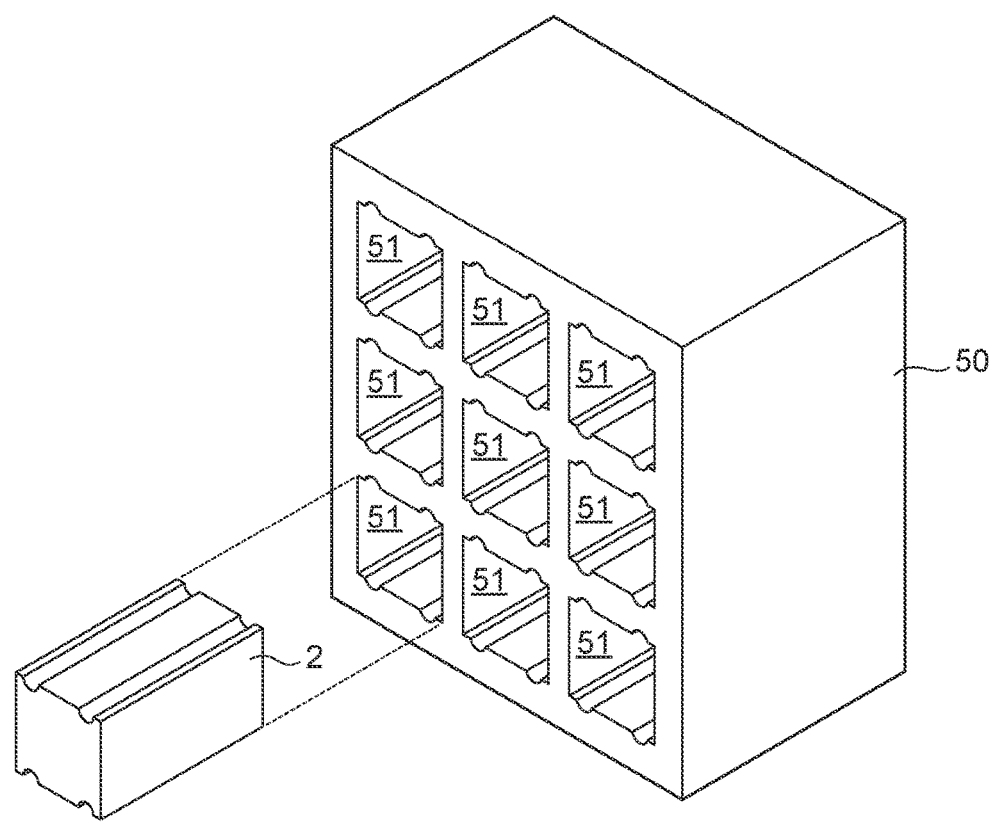
FIG. 14 is an exploded perspective view of a heat exchanger according to at least one embodiment of the present disclosure.

As shown in FIG. 14, the heat exchanger 1 according to the fifth embodiment of the present disclosure includes a body part 2 having substantially the same configuration as the body part 2 of the heat exchanger 1 according to the fourth embodiment, and a housing part 50 into which the body part 2 can be inserted. The body part 2 of the fifth embodiment differs from the body part 2 of the fourth embodiment in that the first fixed wall 42 and the second fixed wall 46 do not have the flange portion 42a (see FIG. 11) and the flange portion 46a (see FIG. 11), respectively. The housing part 50 has an insertion space 51 into which the body part 2 is inserted. In FIG. 14, the number of insertion spaces 51 is nine, but only one insertion space 51 may be formed, or any multiple number of insertion spaces 51 may be formed, without limiting the number to nine. When multiple insertion spaces 51 are formed in the housing part 50, the layout of the insertion spaces 51 can be freely designed.

Figure 15:
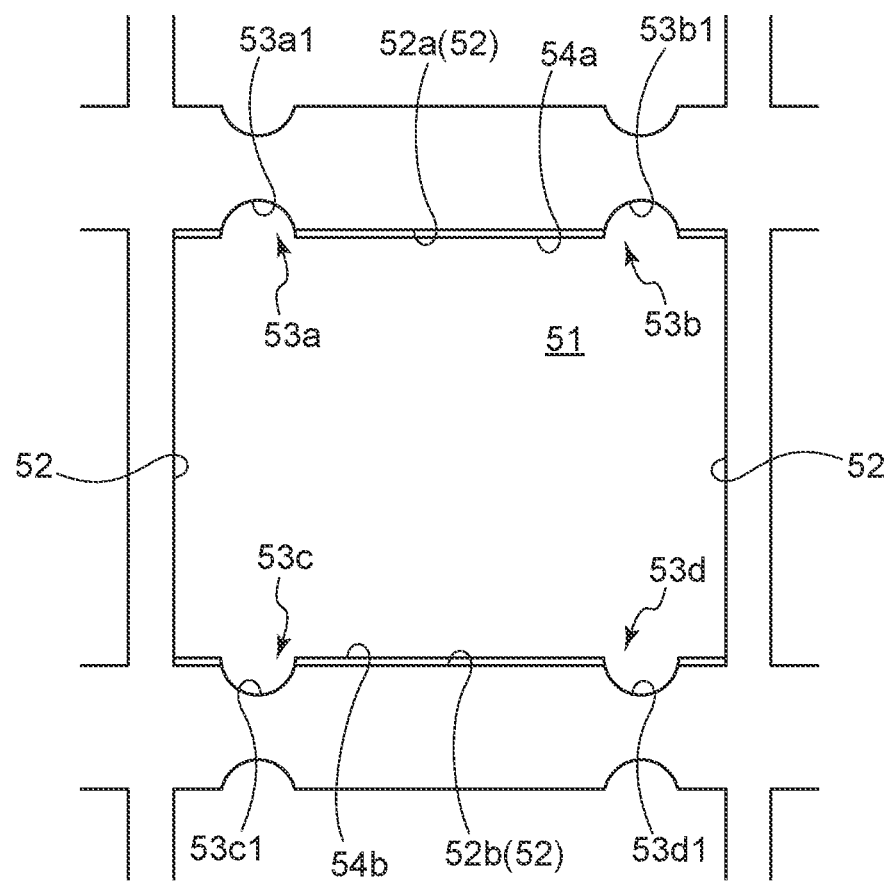
FIG. 15 is an enlarged front view of a portion of a housing part of a heat exchanger according to at least one embodiment of the present disclosure.

As shown in FIG. 15, the insertion space 51 is defined by four inner wall surfaces 52. These four inner wall surfaces 52 include an inner wall surface 52a facing one end side of the body part 2 provided with the first header passage 4 (see FIG. 11) and the second header passage 7 (see FIG. 11), and an inner wall surface 52b facing the other end side of the body part 2 provided with the first header passage 5 (see FIG. 1) and the second header passage 6 (see FIG. 1), when the body part 2 is inserted into the insertion space 51. The inner wall surface 52a has two grooves 53a and 53b extending in the direction in which the body part 2 is inserted into the insertion space 51, and a resin seal member 54a is attached to a portion other than the grooves 53a and 53b. Similarly, the inner wall surface 52b has two grooves 53c and 53d extending in the direction in which the body part 2 is inserted into the insertion space 51, and a resin seal member 54b is attached to a portion other than the grooves 53c and 53d.

When the body part 2 is inserted into the insertion space 51, a groove demarcation wall 53a1 that defines the groove 53a is combined with the first fixed wall 42 (see FIG. 11) fixed to one end side of the body part 2 to define the first header passage 4 (see FIG. 11), a groove demarcation wall 53b1 that defines the groove 53b is combined with the second fixed wall 46 (see FIG. 11) fixed to one end side of the body part 2 to define the second header passage 7 (see FIG. 11), a groove demarcation wall 53c1 that defines the groove 53c is combined with the first fixed wall 42 fixed to the other end side of the body part 2 to define the first header passage 5 (see FIG. 1), and a groove demarcation wall 53d1 that defines the groove 53d is combined with the second fixed wall 46 fixed to the other end side of the body part 2 to define the second header passage 6 (see FIG. 1). Thus, each of the groove demarcation walls 53a1 and 53c1 constitutes the first separation wall 43 (see FIG. 11), and each of the groove demarcation walls 53c1 and 53d1 constitutes the second separation wall 47 (see FIG. 11).

<Heat Exchange Operation of Heat Exchanger According to Fifth Embodiment of Present Disclosure>

In the heat exchanger 1 according to the fifth embodiment of the present disclosure, the configuration of each unit in which the body part 2 is inserted into each insertion space 51 is the same as the configuration of the heat exchanger 1 according to the fourth embodiment, so that the heat exchange operation between the first fluid and the second fluid in each unit is the same as that in the fourth embodiment. When the heat exchanger 1 has a plurality of units, the heat exchange capacity can be easily adjusted by inserting the required number of body parts 2 into the insertion spaces 51 according to the required heat exchange capacity. Further, since the plurality of units can be arranged without gaps, the entire heat exchanger 1 can be made compact. Further, if a problem occurs in any of the units, maintenance can be performed only on the unit in which the problem occurs without stopping the entire heat exchanger 1, so that shutdown of the device including the heat exchanger 1 can be avoided.

<Method of Producing Heat Exchanger According to Fifth Embodiment of Present Disclosure>

Figure 6:
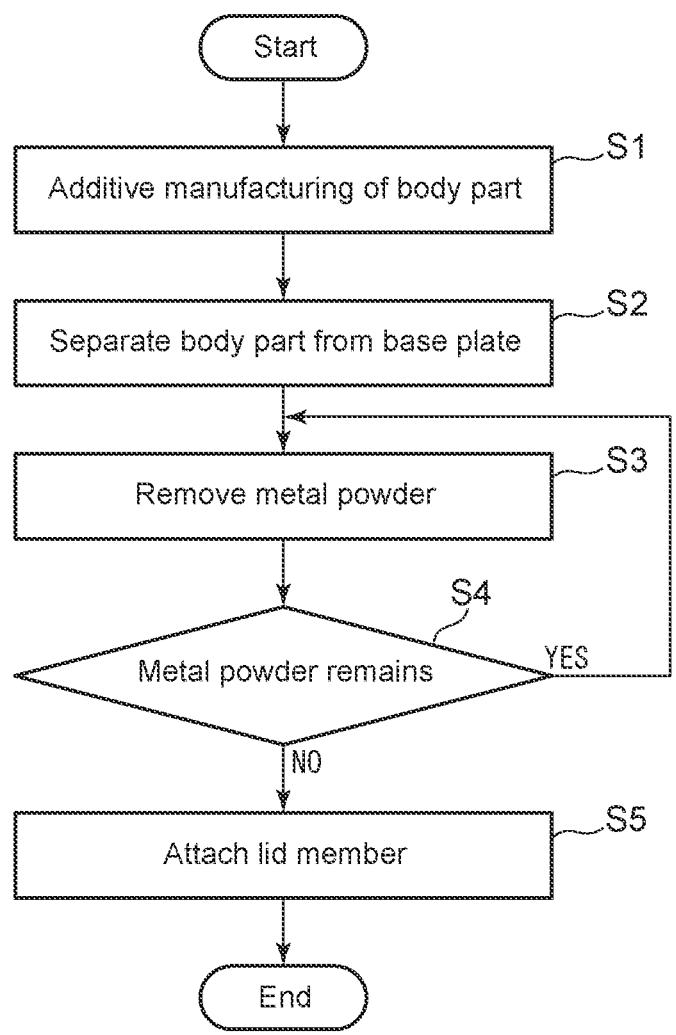
FIG. 6 is a flowchart of a method of producing a heat exchanger according to at least one embodiment of the present disclosure.

Since the body part 2 of the fifth embodiment has substantially the same configuration as the body part 2 of the fourth embodiment, the method of producing the heat exchanger 1 according to the fifth embodiment of the present disclosure is the same as the method of producing the heat exchanger 1 according to the fourth embodiment up to steps S1 to S4 of the flowchart of FIG. 6. Thus, in the fifth embodiment, the metal powder remaining in the first passage 21 and the second passage 22 can be easily removed as in the fourth embodiment. In the fifth embodiment, the attachment of the lid member in step S5 corresponds to the operation of inserting the body part 2 into the insertion space 51.

<Method of Confirming Blockage after Use of Heat Exchanger According to Fifth Embodiment of Present Disclosure>

In the method of confirming blockage after the use of the heat exchanger 1 according to the fifth embodiment of present disclosure, the detachment of the lid member in step S11 of the flowchart of FIG. 7 corresponds to the detachment of the body part 2 from the insertion space 51. Since the body part 2 of the fifth embodiment has substantially the same configuration as the body part 2 of the fourth embodiment, steps S12 and S13 of the flowchart of FIG. 7 are the same as those in the fourth embodiment. Thus, in the fifth embodiment, the presence or absence of blockage in the first passage 21 and the second passage 22 can be easily confirmed as in the fourth embodiment. The attachment of the lid member in step S14 of the flowchart of FIG. 7 corresponds to the operation of inserting the body part 2 into the insertion space 51.

Sixth Embodiment

Next, a heat exchanger according to the sixth embodiment will be described. The heat exchanger according to the sixth embodiment is modified from the first to third embodiments in the configuration of the seal between the covering part 3 and the body part 2. In the following, the sixth embodiment will be described in conjunction with a modification of the configuration of the seal of the third embodiment, but the sixth embodiment may be obtained by modifying the configuration of the seal of the first or second embodiment. In the sixth embodiment, the same constituent elements as those in the third embodiment are associated with the same reference numerals and not described again in detail.

Each of the sixth and subsequent embodiments is an invention related to sealing between the body part 2 and the covering part 3. Therefore, the configuration of the heat exchanger 1 according to each of the sixth and subsequent embodiments is the same as the configuration of any of the first to third embodiments in the state where the covering part 3 is attached to the body part 2. Therefore, the heat exchange operation in the heat exchanger 1 according to each of the sixth and subsequent embodiments is the same as the heat exchange operation in the heat exchanger 1 according to any of the first to third embodiments. Further, the method of producing the heat exchanger 1 and the method of confirming blockage after the use of the heat exchanger 1 according to each of the sixth and subsequent embodiments are the same as the method of producing the heat exchanger 1 and the method of confirming blockage after the use of the heat exchanger 1 according to any of the first to third embodiments. Therefore, in each of the sixth and subsequent embodiments, unless otherwise specified, the heat exchange operation in the heat exchanger 1, the method of producing the heat exchanger 1, and the method of confirming blockage after the use of the heat exchanger 1 will not be described again.

<Configuration of Heat Exchanger According to Sixth Embodiment of Present Disclosure>

Figure 16:
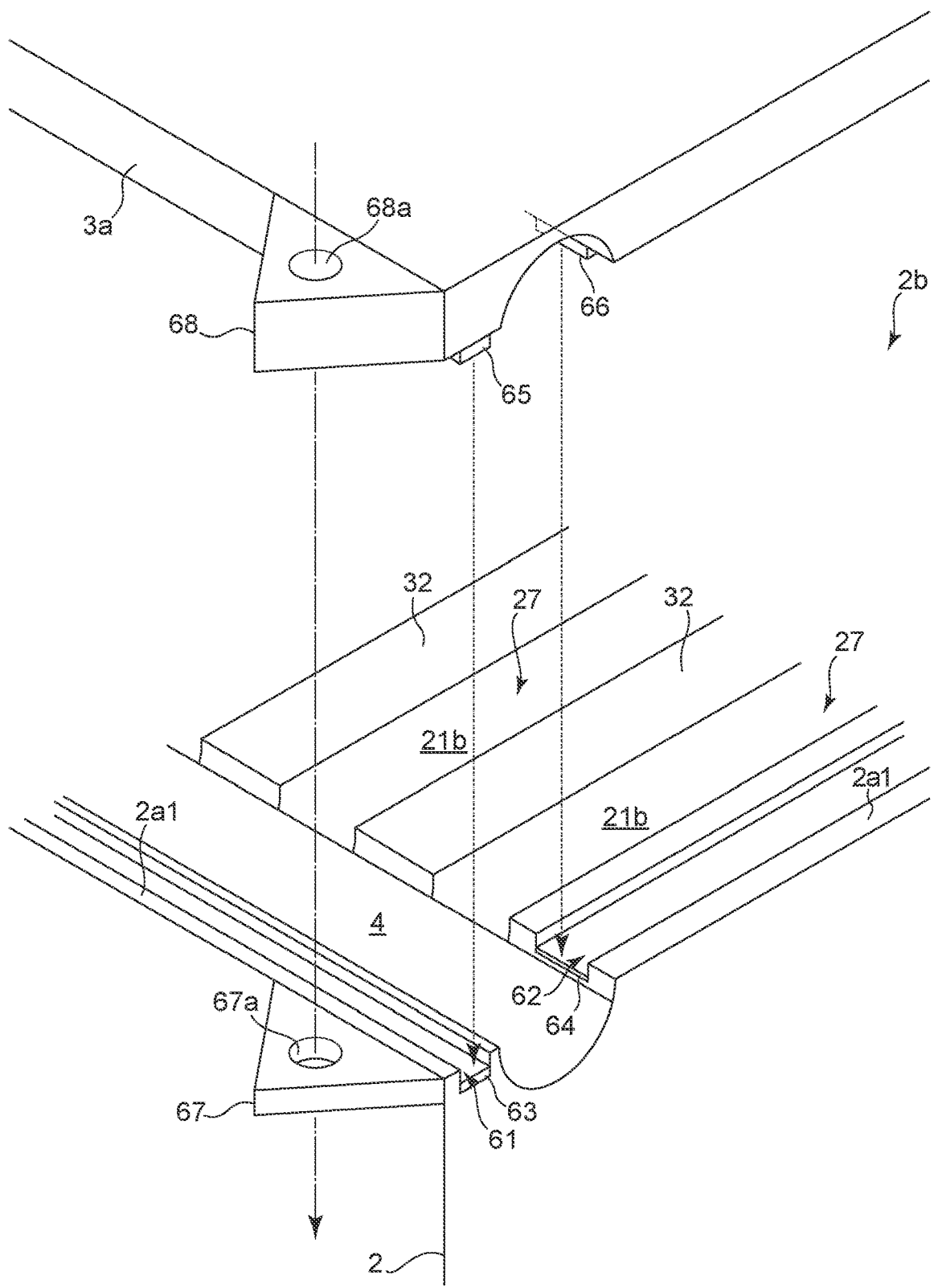
FIG. 16 is an exploded perspective view of a portion of one end side of a heat exchanger according to at least one embodiment of the present disclosure.

As shown in FIG. 16, in the heat exchanger 1 according to the sixth embodiment of the present disclosure, the end surface 2b of the body part 2 includes a flat portion 2a1 extending along the edge of the end surface 2b. The first header passage 4 and the first opening portion 27 are surrounded by the flat portion 2a1. The flat portion 2a1 has a groove portion 61 recessed and extending along the first header passage 4 and the second header passage 7 (see FIG. 4), and a groove portion 62 recessed and extending along the first distribution passage 21b. Seal members 63 and 64 are provided at the bottom portions of the groove portions 61 and 62, respectively. The back surface of the lid member 3a facing the end surface 2a has protruding ridge portions 65 and 66 configured to be fitted into the groove portions 61 and 62, respectively.

In the vicinity of the end surface 2a of the body part 2, a flange portion 67 is disposed. The flange portion 67 has a hole 67a into which a bolt can be inserted. The lid member 3a has a flange portion 68 at a position overlapping the flange portion 67 when the lid member 3a is attached to the body part 2. The flange portion 68 has a hole 68a into which a bolt can be inserted. The configuration is otherwise the same as that of the first embodiment.

When the ridge portions 65 and 66 are fitted into the groove portions 61 and 62, the ridge portions 65 and 66 press the seal members 63 and 64, respectively. In order to maintain this state, a bolt is inserted into the respective holes 67a and 67b of the superimposed flange portions 67 and 68 and fastened with a nut. As a result, a seal is formed between the lid member 3a and the body part 2.

Thus, when the lid member 3a is attached to the body part 2 at the time of producing the heat exchanger 1 or after the maintenance of the heat exchanger 1, the seal can be easily formed between the body part 2 and the lid member 3a. Similarly, on the end surface 2c on the opposite side of the body part 2, with the same seal configuration, the seal can be easily formed between the body part 2 and the lid member 3a.

<Configuration of Modifications of Heat Exchanger According to Sixth Embodiment of Present Disclosure>

In the sixth embodiment, the recessed groove portions 61 and 62 are formed on the end surface 2a of the body part 2, while the protruding ridge portions 65 and 66 are formed on the lid member 3a. However, contrary to this configuration, the recessed groove portions 61 and 62 may be formed on the lid member 3a, while the protruding ridge portions 65 and 66 may be formed on the end surface 2a of the body part 2. Further, in the sixth embodiment, the seal members 63 and 64 are disposed inside the groove portions 61 and 62, but the seal members 63 and 64 may be disposed in the ridge portions 65 and 66, respectively.

Figure 17:
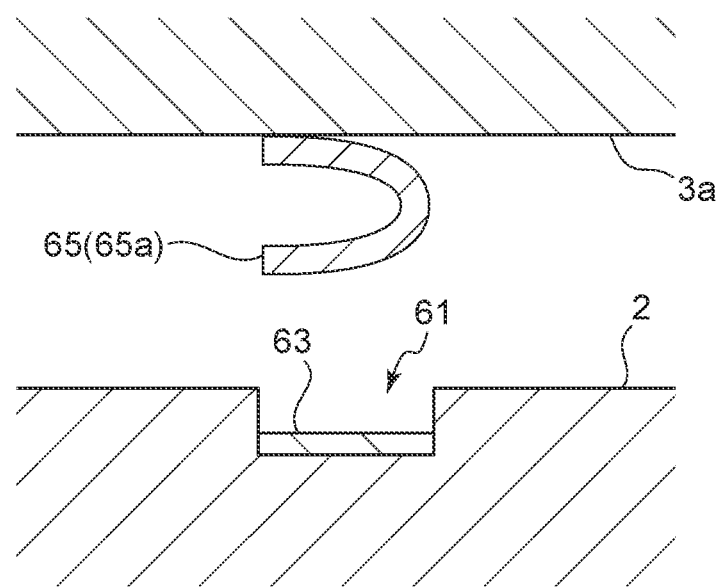
FIG. 17 is an exploded cross-sectional view of a portion of one end side of a modification of the heat exchanger according to at least one embodiment of the present disclosure.

In the sixth embodiment, the ridge portions 65 and 66 are not elastically deformable even when pressing the seal members 63 and 64, but they may be configured to be elastically deformable in a depth direction of the groove portions 61 and 62 when pressing the seal members 63 and 64 in the groove portions 61 and 62. For example, as shown in FIG. 17, the ridge portion 65 may be a spring member 65a having a cross-sectional shape curved in a substantially C shape. In this case, the seal member 63 may be disposed in the spring member 65a instead of in the groove portion 61. Although not shown in FIG. 17, the ridge portion 66 can have the same configuration.

Seventh Embodiment

Next, a heat exchanger according to the seventh embodiment will be described. The heat exchanger according to the seventh embodiment is modified from the sixth embodiment in the configuration of the seal between the covering part 3 and the body part 2. In the seventh embodiment, the same constituent elements as those in the sixth embodiment are associated with the same reference numerals and not described again in detail.

<Configuration of Heat Exchanger According to Seventh Embodiment of Present Disclosure>

Figure 18:
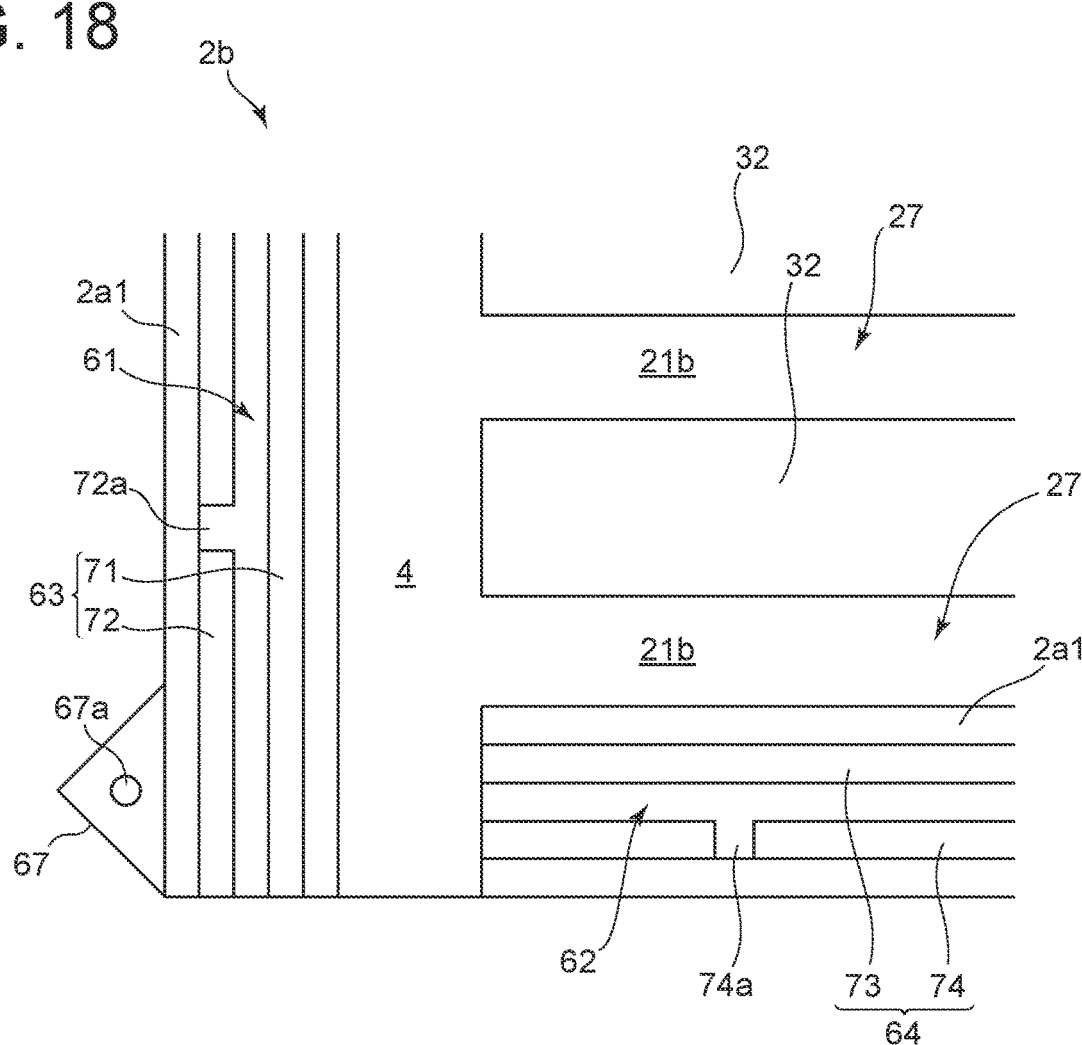
FIG. 18 is a plan view of a portion of one end side of the body part of the heat exchanger according to at least one embodiment of the present disclosure.

As shown in FIG. 18, in the heat exchanger 1 according to the seventh embodiment of the present disclosure, the seal member 63 has an inner seal member 71, and an outer seal member 72 disposed on the opposite side of the inner seal member 71 from the first opening portion 27 and the second opening portion 28. Further, the seal member 64 has an inner seal member 73, and an outer seal member 74 disposed on the opposite side of the inner seal member 73 from the first opening portion 27 and the second opening portion 28. The outer seal members 72 and 74 have notches 72a and 74a with a distance in the directions of extension of the outer seal members, respectively. The configuration is otherwise the same as that of the sixth embodiment.

When the first fluid or the second fluid leaks from any portion of the inner seal members 71 and 73, the leaked fluid flows out through the notches 72a and 74a of the outer seal members 72 and 74. Since the positions of the notches 72a and 74a are known, when the first fluid or the second fluid leaks, the leaked fluid can be confirmed through the notches 72a and 74a, so that the leakage can be detected easily at an early stage.

<Configuration of Modifications of Heat Exchanger According to Seventh Embodiment of Present Disclosure>

Figure 19:
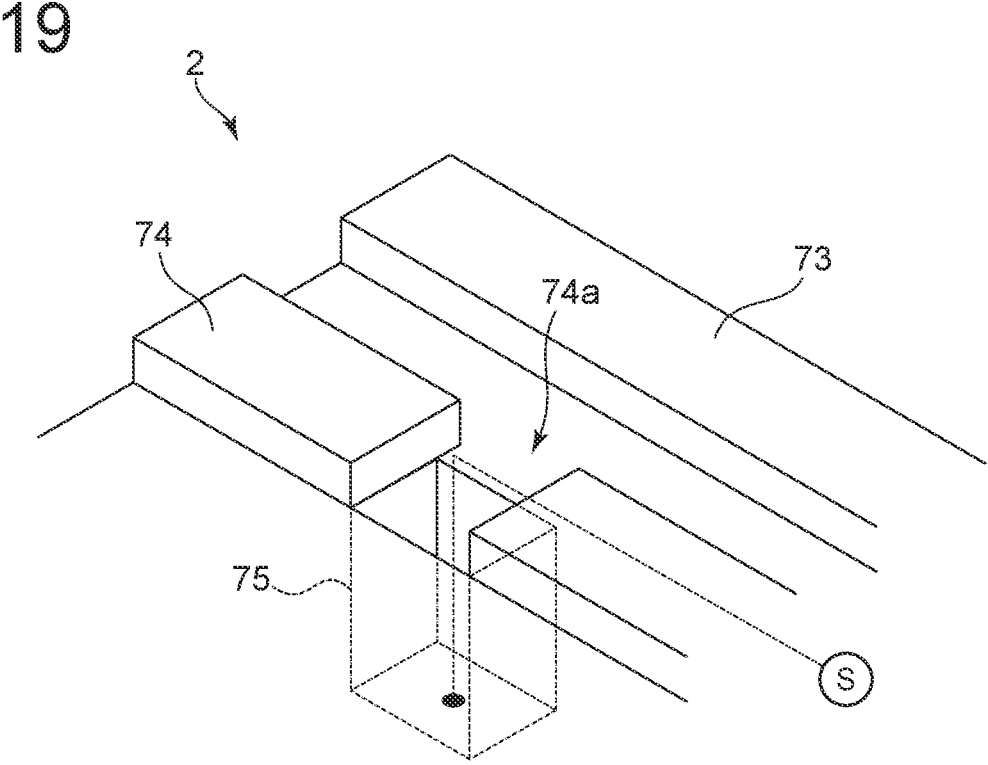
FIG. 19 is a perspective view of a portion of one end side of the body part of a modification of the heat exchanger according to at least one embodiment of the present disclosure.

As shown in FIG. 19, the body part 2 may be provided with a storage part 75 communicating with the notch 74a to store the first fluid or the second fluid leaking through the notch 74a. Although not shown in FIG. 19, the body part 2 may be provided with a storage part, similar to the storage part 75, communicating with the notch 74a to store the first fluid or the second fluid leaking through the notch 72a. Since the leaked fluid can be stored in the storage part 75, it is possible to temporarily prevent the leakage of the heat exchanger 1 to the outside.

In this case, a sensor S, which is a detection part for detecting the inflow of the first fluid or the second fluid into the storage part 75, may be provided. Thus, since the leakage of the first fluid or the second fluid can be detected by the sensor S, the leakage can be detected at an early stage by remote monitoring of detection by the sensor S.

Figure 20:
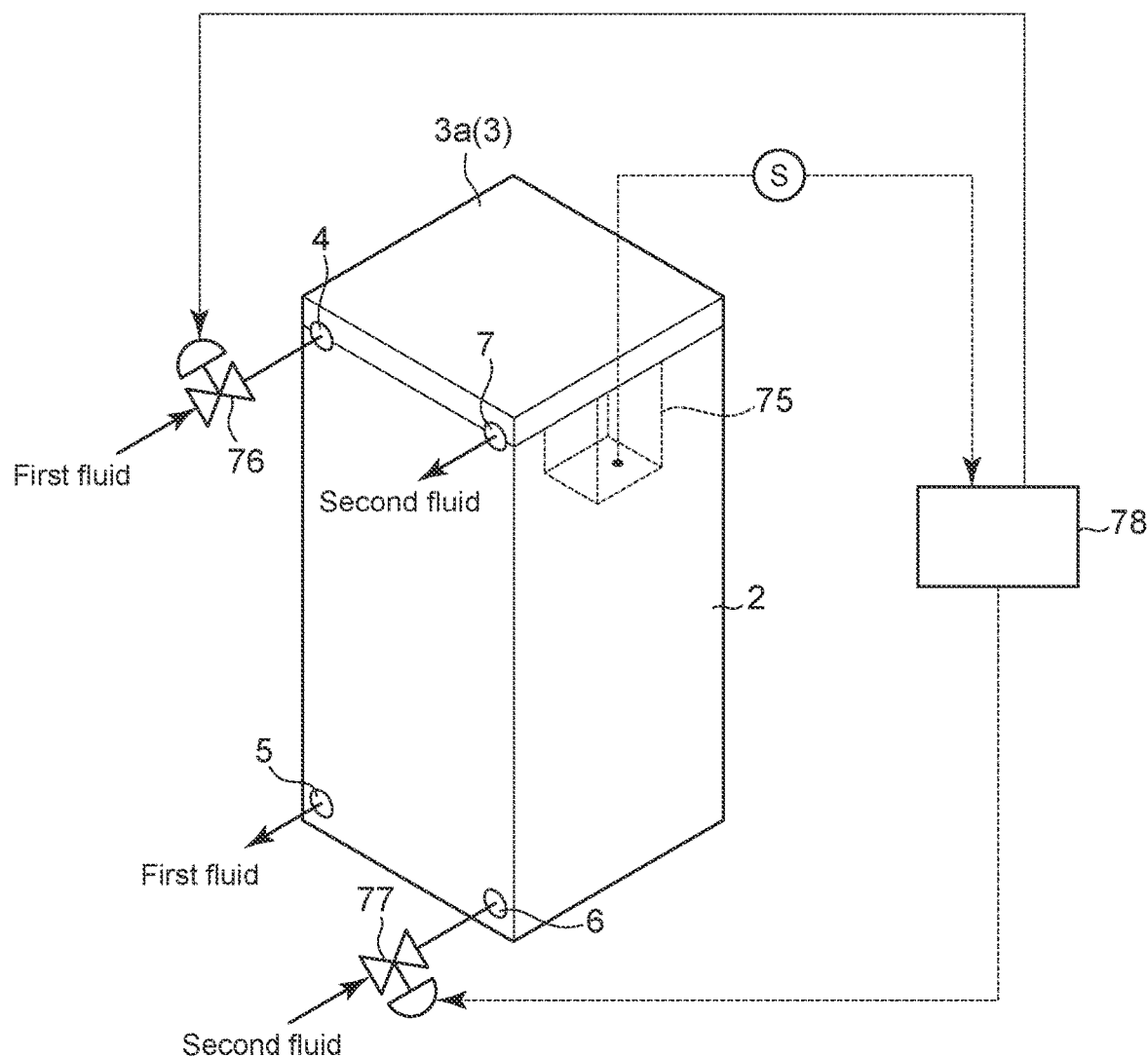
FIG. 20 is a block configuration diagram of another modification of the heat exchanger according to at least one embodiment of the present disclosure.

As shown in FIG. 20, the heat exchanger 1 may be equipped with a first open/close valve 76 for supplying the first fluid to the first passage 21 (see FIG. 18) or stopping the supply of the first fluid, a second open/close valve 77 for supplying the second fluid to the second passage 22 (see FIG. 18) or stopping the supply of the second fluid, and a control part 78, such as a computer, electrically connected to the sensor S, the first open/close valve 76, and the second open/close valve 77. In this case, the control part 78 is configured to close the first open/close valve 76 and the second open/close valve 77 when a signal indicating the detection of inflow of the first fluid or the second fluid into the storage part 75 is transmitted from the sensor S. Thus, since the control part 78 automatically closes the first open/close valve 76 and the second open/close valve 77 to stop the supply of the first fluid to the first passage 21 and the supply of the second fluid to the second passage 22 on the basis of the detection of leakage by the sensor S, it is possible to prevent the leakage of the heat exchanger 1 to the outside at an early stage.

Eighth Embodiment

Next, a heat exchanger according to the eighth embodiment will be described. The heat exchanger according to the eighth embodiment is modified from the third embodiment in the configuration of the seal between the covering part 3 and the body part 2. In the eighth embodiment, the same constituent elements as those in the third embodiment are associated with the same reference numerals and not described again in detail.

<Configuration of Heat Exchanger According to Eighths Embodiment of Present Disclosure>

Figure 21:
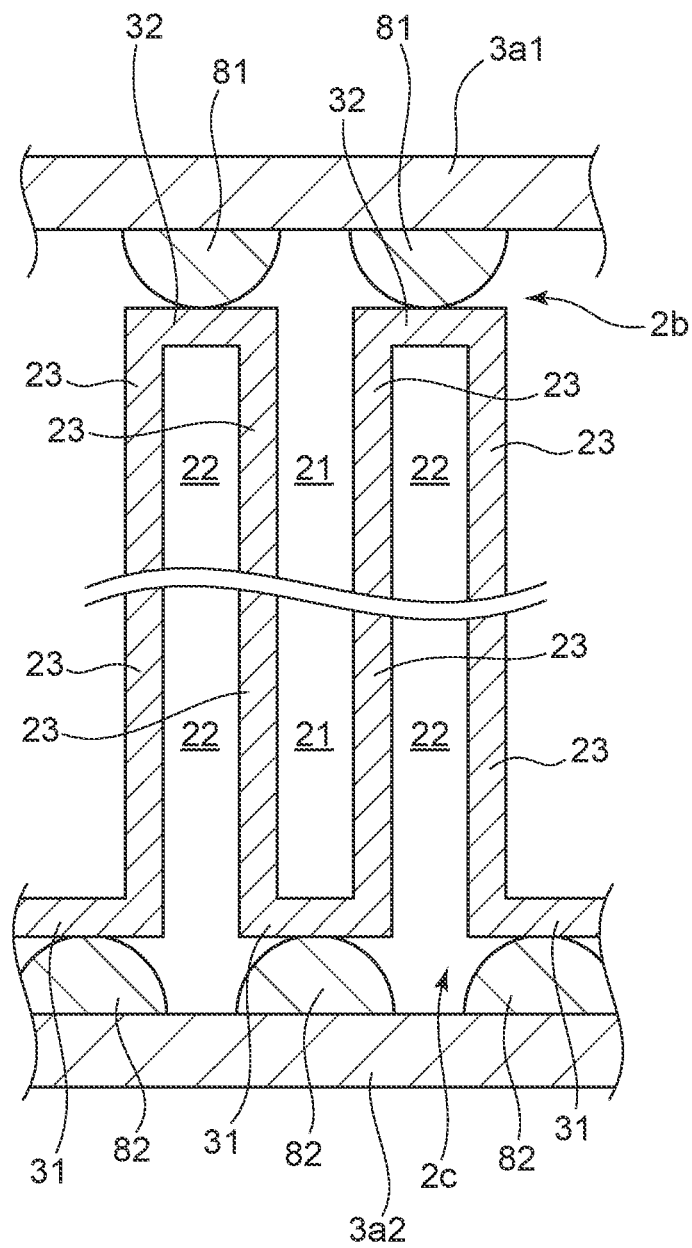
FIG. 21 is a cross-sectional view of a portion of one end side of the heat exchanger according to at least one embodiment of the present disclosure.

As shown in FIG. 21, a plurality of first seal members 81 and a plurality of second seal members 82 are disposed on the back surfaces of the first lid 3a1 and the second lid 3a2, respectively. Each first seal member 81 and each second seal member 82 are configured to abut on the first closing wall 31 and the second closing wall 32, respectively, when the first lid 3a1 and the second lid 3a2 are attached to the body part 2 (see FIG. 1). To this end, the first seal member 81 and the second seal member 82 are configured to extend at least from one end to the other end of each of the first closing wall 31 and the second closing wall 32, respectively, when the first lid 3a1 and the second lid 3a2 are attached to the body part 2. The configuration is otherwise the same as that of the third embodiment.

Thus, since the first seal member 81 and the second seal member 82 seal a space between two first passages 21 and a space between two second passages 22, respectively, the weight of the heat exchanger 1 can be reduced, without increasing the thickness of the first lid 3a1 and second lid 3a2.

In the eighth embodiment, preferably, the plurality of first closing walls 31 are flush with each other on the second end surface 2c, and the plurality of second closing walls 32 are flush with each other on the first end surface 2b. With this configuration, since the pressing force of each first seal member 81 against each first closing wall 31 is uniform when the first lid 3a1 is attached to the body part 2, and the pressing force of each second seal member 82 against each second closing wall 32 is uniform when the second lid 3a2 is attached to the body part 2, the variation in sealing performance of each first seal member 81 and each second seal member 82 can be reduced.

In order to make each of the plurality of first closing walls 31 and the plurality of second closing walls 32 flush, for example, the first closing walls 31 and the second closing walls 32 may be manufactured thicker and then shaved, i.e., thinned so that the plurality of first closing walls 31 are flush with each other and the plurality of second closing walls 32 are flush with each other. Thus, the plurality of first closing walls 31 and the plurality of second closing walls 32 can be easily made flush.

In the eighth embodiment, the material used for the first seal member 81 and the second seal member 82 needs to be selected according to the heat resistance required for the heat exchanger 1, i.e., the temperatures of the first fluid and the second fluid. For example, when the temperatures of the first fluid and the second fluid are about 100° C. or lower, a resin such as rubber may be selected as the material. When the temperatures of the first fluid and the second fluid range from about 100° C. to 500° C., metal that is easy to process, such as silver, gold, or indium may be selected as the material.

Ninth Embodiment

Next, a heat exchanger according to the ninth embodiment will be described. The heat exchanger according to the ninth embodiment is modified from the first to third embodiments in the configuration of the seal between the covering part 3 and the body part 2. In the following, the ninth embodiment will be described in conjunction with a modification of the configuration of the seal of the first embodiment, but the ninth embodiment may be obtained by modifying the configuration of the seal of the second or third embodiment. In the ninth embodiment, the same constituent elements as those in the first embodiment are associated with the same reference numerals and not described again in detail.

<Configuration of Heat Exchanger According to Ninth Embodiment of Present Disclosure>

Figure 22:
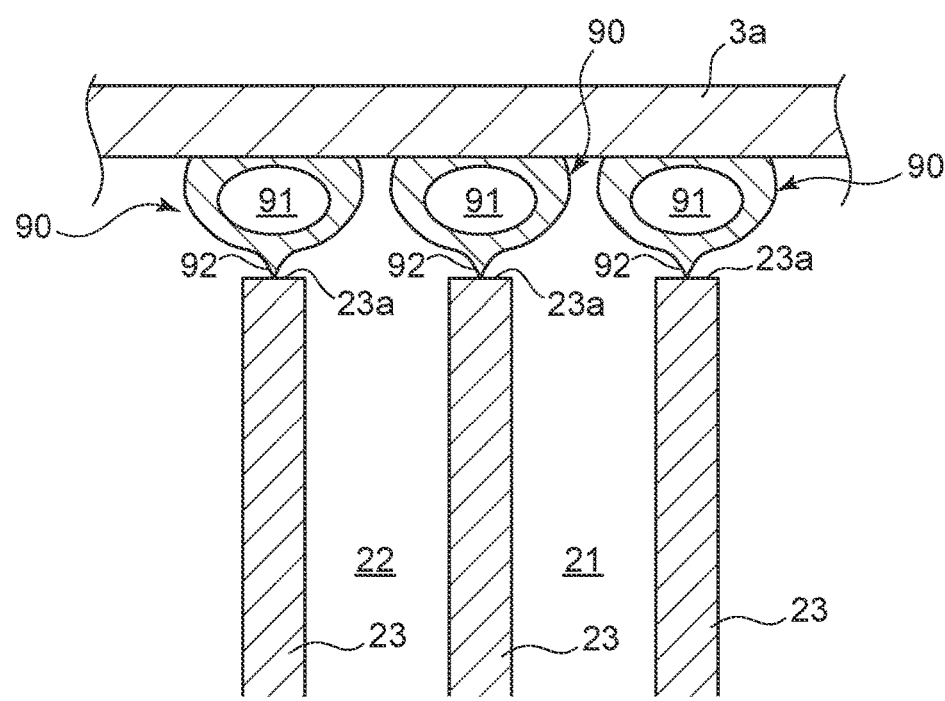
FIG. 22 is a cross-sectional view of a portion of one end side of the heat exchanger according to at least one embodiment of the present disclosure.

As shown in FIG. 22, a plurality of seal members 90 are disposed on the back surface of the lid member 3a. Each seal member 90 is configured to abut on the end portion 23a of the partition wall 23 when the lid member 3a is attached to the body part 2 (see FIG. 1). To this end, the seal member 90 is configured to extend at least from one end to the other end of the end portion 23a of the partition wall 23 when the lid member 3a is attached to the body part 2.

The seal member 90 includes a cavity portion 91 disposed inside the seal member 90 and an abutting portion 92 which abuts on the end portion 23a of the partition wall 23. Thus, when the lid member 3a is attached to the body part 2, and the abutting portion 92 is pressed against the end portion 23a of the partition wall 23, the seal member 90 is deformed so that the cavity portion 91 is crushed. The smaller the area where the abutting portion 92 abuts on the end portion 23a of the partition wall 23, the more pressure the abutting portion 92 receives when the abutting portion 92 is pressed against the end portion 23a, and the more easily the cavity portion 91 is crushed. The configuration is otherwise the same as that of the first embodiment.

Thus, when the abutting portion 92 is pressed against the end portion 23a of the partition wall 23, the seal member 90 is deformed so that the cavity portion 91 is crushed, and the space between the first passage 21 and the second passage 22 that are adjacent to each other is reliably sealed.

<Configuration of Modification of Heat Exchanger According to Ninth Embodiment of Present Disclosure>

The shape of the seal member 90 is not limited to the shape shown in FIG. 22. The seal member 90 may have any shape as long as the seal member 90 is deformed so that the cavity portion 91 is crushed when the abutting portion 92 is pressed against the end portion 23a of the partition wall 23. It may have a porous structure, so-called lattice, composed of multiple smaller cavities, instead of the configuration with one large cavity portion 91 as shown in FIG. 22. Further, not only the configuration of the cavity portion 91 but also the shape of the abutting portion 92 can be freely designed.

Tenth Embodiment

Next, a heat exchanger according to the tenth embodiment will be described. The heat exchanger according to the tenth embodiment is modified from the first to third embodiments in the configuration of the seal between the covering part 3 and the body part 2. In the following, the tenth embodiment will be described in conjunction with a modification of the configuration of the seal of the first embodiment, but the tenth embodiment may be obtained by modifying the configuration of the seal of the second or third embodiment. In the tenth embodiment, the same constituent elements as those in the first embodiment are associated with the same reference numerals and not described again in detail.

<Configuration of Heat Exchanger According to Tenth Embodiment of Present Disclosure>

Figure 23:
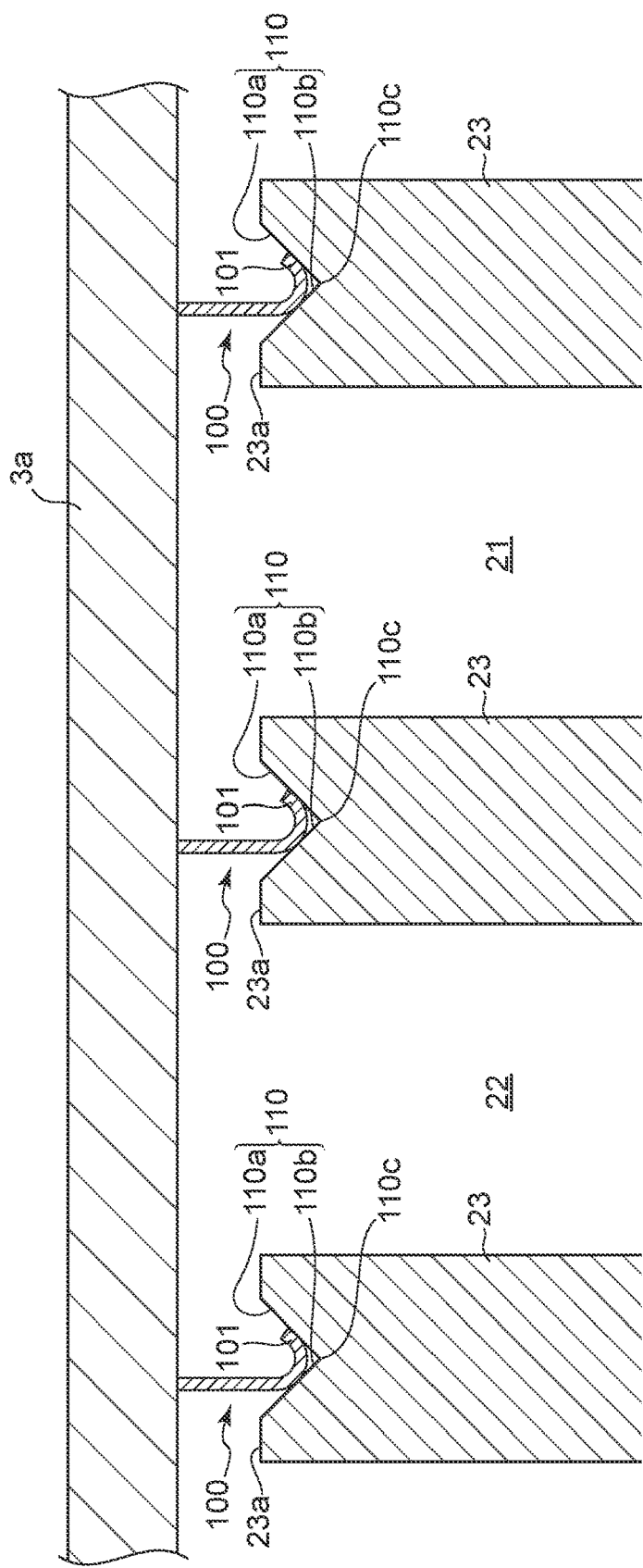
FIG. 23 is a cross-sectional view of a portion of one end side of the heat exchanger according to at least one embodiment of the present disclosure.

As shown in FIG. 23, a plurality of seal members 100 are disposed on the back surface of the lid member 3a. Each seal member 100 is configured to abut on the end portion 23a of the partition wall 23 when the lid member 3a is attached to the body part 2 (see FIG. 1). To this end, the seal member 100 is configured to extend at least from one end to the other end of the end portion 23a of the partition wall 23 when the lid member 3a is attached to the body part 2.

The end portion 23a of the partition wall 23 has a seal groove portion 110 recessed with respect to the end portion 23a. The seal groove portion 110 is defined by two inclined surfaces 110a and 110b connected to each other at a bottom portion 110c of the seal groove portion 110. For example, the seal groove portion 110 has a V-shaped cross-sectional shape. The seal member 100 includes a deformable abutting portion 101. The abutting portion 101 is configured to be inserted in the seal groove portion 110 and abut on each of the two inclined surfaces 110a and 110a. For example, the cross-section of the abutting portion 101 has an arcuate curved shape. Thus, the seal member 100 has a substantially J-shaped cross-sectional shape. The configuration is otherwise the same as that of the first embodiment.

Figure 24:
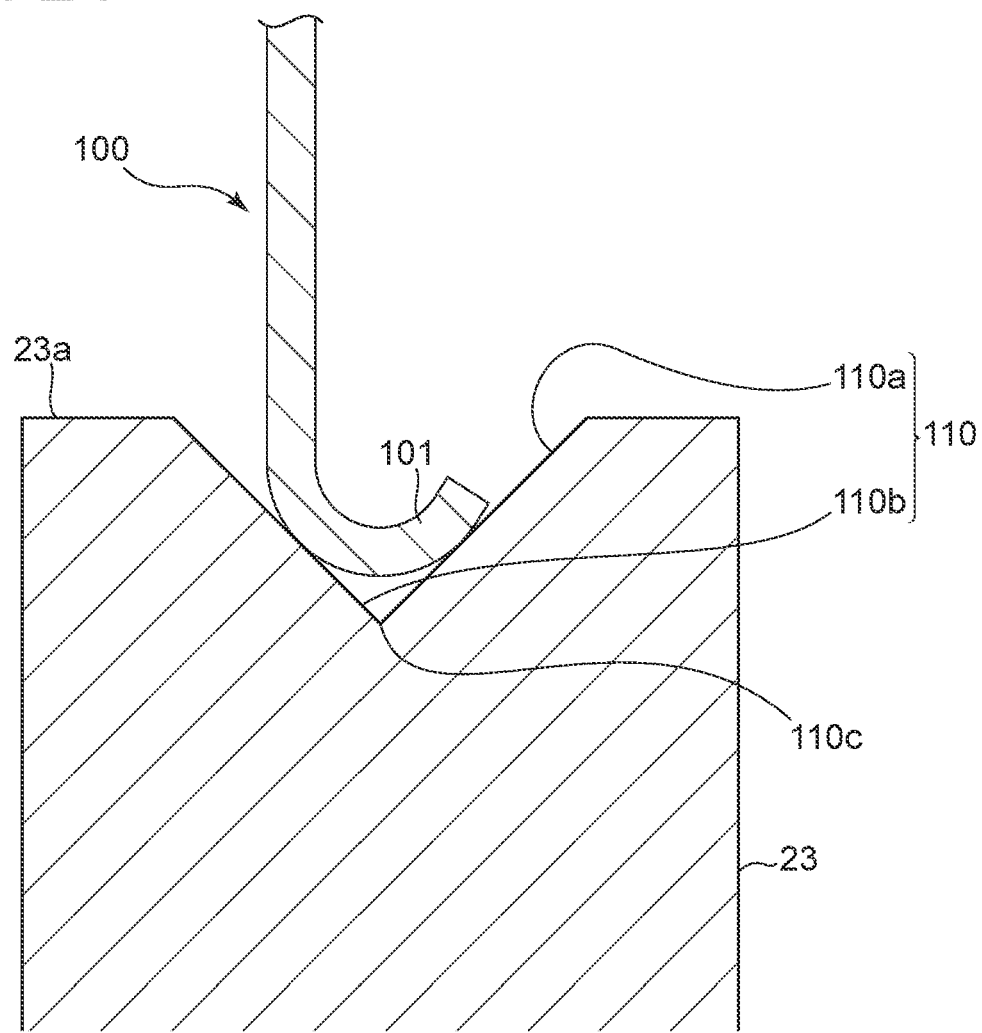
FIG. 24 is an enlarged cross-sectional view of a portion of one end side of the heat exchanger according to at least one embodiment of the present disclosure.

As shown in FIG. 24, when the seal member 100 and the seal groove portion 110 are aligned, the abutting portion 101 of the seal member 100 abuts on each of the two inclined surfaces 110a and 110b of the seal groove portion 110. However, if the position of the seal member 100 is displaced in the thickness direction of the partition wall 23, the abutting portion 101 may abut on only one inclined surface 110b, for example. However, by pressing the seal member 100 against the inclined surface 110b in this state, the abutting portion 101 is deformed, the contact position between the abutting portion 101 and the inclined surface 110b is displaced downward, and the other portion of the abutting portion 101 eventually comes into contact with the other inclined surface 110a. Conversely, when the abutting portion 101 abuts on only the other inclined surface 110a, similarly, by pressing the seal member 100 against the inclined surface 110b so as to deform, the abutting portion 101 eventually comes into contact with the two inclined surfaces 110a and 110b.

Thus, when the abutting portion 101 is pressed against the seal groove portion 110, the abutting portion 101 is deformed and abuts on each of the two inclined surfaces 110a and 110a, so that the space between the first passage 21 and the second passage 22 that are adjacent to each other can be reliably sealed.

<Configuration of Modification of Heat Exchanger According to Tenth Embodiment of Present Disclosure>

In the tenth embodiment, the abutting portion 101 has a substantially J-shaped cross-sectional shape, but it is not limited to this configuration. The abutting portion 101 may have any configuration as long as the abutting portion 101 can abut on each of the two inclined surfaces 110a and 110b when it is inserted into the seal groove portion 110, or even if the abutting portion 101 abuts on only one of the two inclined surfaces 110a and 110b when it is inserted into the seal groove portion 110, the seal member 100 can deform and abut on each of the two inclined surfaces 110a and 110b. Specifically, the seal member 100 may have a bent shape near the tip, for example, a substantially L-shape instead of a substantially J-shape.

In the tenth embodiment, the seal groove portion 110 has a V-shaped cross-sectional shape, but it is not limited to this configuration. The inclined surfaces 110a and 110b do not necessarily have to be flat surfaces. The inclined surfaces 110a and 110b may have a curvature to form a seal groove portion with a cross-section of V-shape close to a U-shape. However, when the inclined surfaces 110a and 110b have a curvature, it needs to be smaller than the curvature of the abutting portion 101 of the seal member 100.

In each of the ninth and tenth embodiments, we have described the seal members 90 and 100 configured to at least partially deform when the seal member is pressed against the end portion 23a of the partition wall 23, but the seal member is not limited to these two configurations (including modifications). Any type of seal member can be adopted as long as it is at least partially deformable when it abuts and is pressed against the end portion 23a of the partition wall 23.

The contents described in the above embodiments would be understood as follows, for instance.

[1] A heat exchanger according to one aspect is a heat exchanger (1) for heat exchange between a first fluid and a second fluid, comprising: a body part (2) which is an additive manufactured body and includes a first passage (21) through which the first fluid flows and a second passage (22) through which the second fluid flows; and a covering part (3) attached to the body part (2). The body part (2) has a first opening portion (27) of the first passage (21) and a second opening portion (28) of the second passage (22), and the covering part (3) is attached to the body part (2) so as to cover exposure of the first opening portion (27) and the second opening portion (28).

With the heat exchanger of the present disclosure, although a raw material of additive manufacturing remains inside the first passage and the second passage after additive manufacturing the body part, since the first opening portion of the first passage and the second opening portion of the second passage are exposed, the remaining raw material can be easily removed through the first opening portion and the second opening portion. Further, since the first opening portion of the first passage and the second opening portion of the second passage are exposed by detaching the covering part from the body part after the use of the heat exchanger, the presence or absence of blockage in the first passage and the second passage can be easily confirmed.

[2] A heat exchanger according to another aspect is the heat exchanger of [1], in which the covering part (3) includes a lid member (3a) attached to the body part (2) so as to cover the first opening portion (27) and the second opening portion (28).

With this configuration, since the first opening portion and the second opening portion directly open when the lid member is not attached to the body part, the raw material remaining in the first passage and the second passage can be easily removed, and the presence or absence of blockage in the first passage and the second passage can be easily confirmed.

[3] A heat exchanger according to still another aspect is the heat exchanger of [2], in which the body part (2) includes a first end surface (2b) and a second end surface (2c) disposed at both ends in a direction of extension of the first passage (21) and the second passage (22), respectively. The lid member (3a) includes: a first lid (3a1) attached to the body part (2) so as to cover the first end surface (2b); and a second lid (3a2) attached to the body part (2) so as to cover the second end surface (2c).

With this configuration, by detaching the first lid and the second lid attached to the first end surface and the second end surface, respectively, and illuminating the interior of the first passage and the second passage through the first opening portion and the second opening portion, respectively, light can pass through the first passage and the second passage, so that the presence or absence of the raw material or blockage can be easily confirmed.

[4] A heat exchanger according to still another aspect is the heat exchanger of [3], in which the first opening portion (27) is formed on the first end surface (2b), and the second opening portion (28) is formed on the second end surface (2c).

With this configuration, since the first opening portion and the second opening portion are exposed on the first end surface and the second end surface, respectively, even when the seal between the first end surface and the first lid or the seal between the second end surface and the second lid is incomplete, and the first fluid or the second fluid leaks through the first opening portion or the second opening portion, since only the same fluid leaks at each end surface, it is possible to prevent mixing of the first fluid and the second fluid.

[5] A heat exchanger according to still another aspect is the heat exchanger of [1], in which the body part (2) includes: a first header passage (4, 5) through which the first fluid flows; a first distribution passage (21b) connecting the first header passage (4, 5) and the first passage (21); a second header passage (6, 7) through which the second fluid flows; and a second distribution passage connecting the second header passage (6, 7) and the second passage (22). A first header passage wall (41) defining the first header passage (4, 5) and a second header passage wall (45) defining the second header passage (6, 7) respectively include: a first fixed wall (42) and a second fixed wall (46) fixed to the body part (2); and a first separation wall (43) attached to the first fixed wall (42) to define the first header passage (4, 5) and a second separation wall (47) attached to the second fixed wall (46) to define the second header passage (6, 7). The first opening portion (27) is an opening portion of the first distribution passage (21b) in the first fixed wall (42), the second opening portion (28) is an opening portion of the second distribution passage (22b) in the second fixed wall (46), and the covering part (3) includes the first separation wall (43) and the second separation wall (47).

With this configuration, since the first opening portion and the second opening portion are exposed on the first fixed wall and the second fixed wall, respectively, when the first separation wall and the second separation wall are not attached to the first fixed wall and the second fixed wall which are fixed to the body part, respectively, the raw material remaining in the first passage and the second passage can be easily removed, and the presence or absence of blockage in the first passage and the second passage can be easily confirmed.

[6] A heat exchanger according to still another aspect is the heat exchanger of [5], in which the heat exchanger (1) includes a housing part (50) into which the body part (2) can be inserted. The first separation wall (groove demarcation wall 53a1/53c1) and the second separation wall (groove demarcation wall 53b1/53d1) are provided to the housing part (50). When the body part (2) is inserted into the housing part (50), the first separation wall (groove demarcation wall 53a1/53c1) and the second separation wall (groove demarcation wall 53b1/53d1) are attached to the first fixed wall (42) and the second fixed wall (46), respectively.

With this configuration, even with the heat exchanger of cartridge type including the body part and the housing part into which the body part can be inserted, the raw material remaining in the first passage and the second passage can be easily removed, and the presence or absence of blockage in the first passage and the second passage can be easily confirmed.

[7] A heat exchanger according to still another aspect is the heat exchanger of any of [2] to [4], in which one of the covering part (3) or the body part (2) has a groove portion (61/62) recessed so as to surround at least one of the first opening portion (21) or the second opening portion (22) with the covering part (3) being attached to the body part (2). The other of the covering part (3) or the body part (2) has a ridge portion (65/66) into which the groove portion (61/62) can be inserted. With the covering part (3) being attached to the body part (2), the ridge portion (65/66) is inserted into the groove portion (61/62), and a resin seal member (63/64) is disposed between the ridge portion (65/66) and the groove portion (61/62).

With this configuration, when the covering part is attached to the body part at the time of producing the heat exchanger or after the maintenance of the heat exchanger, the seal can be easily formed between the body part and the covering part.

[8] A heat exchanger according to still another aspect is the heat exchanger of [7], in which the ridge portion (65a/66a) is configured to be elastically deformable in a depth direction of the groove portion (61/62).

With this configuration, it is possible to improve the sealing performance of the seal member.

[9] A heat exchanger according to still another aspect is the heat exchanger of any of [2] to [4], in which the covering part (3) is attached to the body part (2) via a seal member (63/64) between the covering part (3) and the body part (2). The seal member (63/64) includes: an inner seal member (71/73) disposed so as to surround at least one of the first opening portion (27) or the second opening portion (28) with the covering part (3) being attached to the body part (2), and an outer seal member (72/74) disposed on an opposite side of the inner seal member (71/73) from the at least one of the first opening portion (27) or the second opening portion (28). The outer seal member (72/74) has a notch (72a/74a) with a distance in a direction of extension of the outer seal member.

With this configuration, when the first fluid or the second fluid leaks, the leaked fluid can be confirmed through the notch, so that the leakage can be detected easily in an early stage.

[10] A heat exchanger according to still another aspect is the heat exchanger of [9], in which the body part (2) has a storage part (75) communicating with the notch (72a/74a) and capable of storing the first fluid or the second fluid.

With this configuration, since the leaked fluid can be stored in the storage part, it is possible to temporarily prevent the leakage of the heat exchanger to the outside.

[11] A heat exchanger according to still another aspect is the heat exchanger of [10], comprising a detection part (sensor S) for detecting inflow of the first fluid or the second fluid into the storage part (75).

With this configuration, since the leakage of the first fluid or the second fluid can be detected by the detection part, the leakage can be detected at an early stage by remote monitoring of detection by the detection part.

[12] A heat exchanger according to still another aspect is the heat exchanger of [11], comprising: a first open/close valve (76) for supplying the first fluid to the first passage (21) or stopping the supply of the first fluid; a second open/close valve (77) for supplying the second fluid to the second passage (22) or stopping the supply of the second fluid; and a control part (78) electrically connected to the detection part (sensor S), the first open/close valve (76), and the second open/close valve (77). The control part (78) closes the first open/close valve (76) and the second open/close valve (77) when a signal indicating detection of inflow of the first fluid or the second fluid into the storage part (75) is transmitted from the detection part (sensor S).

With this configuration, since the control part automatically closes the first open/close valve and the second open/close valve to stop the supply of the first fluid to the first passage and the supply of the second fluid to the second passage on the basis of the detection of leakage by the detection part, it is possible to prevent the leakage of the heat exchanger to the outside at an early stage.

[13] A heat exchanger according to still another aspect is the heat exchanger of any of [7] to [12], in which the covering part (3) and the body part (2) are provided with flange portions (67, 68) which overlap each other with the covering part (3) being attached to the body part (2).

With this configuration, the seal can be easily formed between the body part and the covering part.

[14] A heat exchanger according to still another aspect is the heat exchanger of [4], in which the second end surface (2c) is provided with at least one first closing wall (31) disposed between adjacent second opening portions (28) to close the first passage (21). The first end surface (2b) is provided with at least one second closing wall (32) disposed between adjacent first opening portions (27) to close the second passage (22). The first lid (3a1) is provided with a first seal member (81) which abuts on the second closing wall (32), and the second lid (3a2) is provided with a second seal member (82) which abuts on the first closing wall (31).

With this configuration, since the first seal member and the second seal member seal a space between two first passages and a space between two second passages, respectively, the weight of the heat exchanger can be reduced, without increasing the thickness of the covering part.

[15] A heat exchanger according to still another aspect is the heat exchanger of [14], in which the second end surface (2c) is provided with a plurality of the first closing walls (31), and the first end surface (2b) is provided with a plurality of the second closing walls (32). The plurality of first closing walls (31) are flush with each other on the second end surface (2c), and the plurality of second closing walls (32) are flush with each other on the first end surface (2b).

With this configuration, since the pressing force of each first seal member against each first closing wall and the pressing force of each second seal member against each second closing wall are uniform when the covering part is attached to the body part, the variation in sealing performance of each first seal member and each second seal member can be reduced.

[16] A heat exchanger according to still another aspect is the heat exchanger of [2] or [3], in which the first passage (21) and the second passage (22) that are adjacent to each other are separated by a partition wall (23). The lid member (3a) is provided with a seal member (90/100) configured to be deformable by abutting on an end portion (23a) of the partition wall (23) when the lid member (3a) is attached to the body part (2).

With this configuration, when the lid member is attached to the body part, the seal member is deformed by abutting on the end portion of the partition wall, so that the space between the first passage and the second passage that are adjacent to each other can be reliably sealed.

[17] A heat exchanger according to still another aspect is the heat exchanger of [16], in which the seal member (90) includes: a cavity portion (91) disposed inside the seal member (90); and an abutting portion (92) which abuts on the end portion (23a) of the partition wall (23). When the abutting portion (92) is pressed against the end portion (23a) of the partition wall (23), the seal member (90) is deformed so that the cavity portion (91) is crushed.

With this configuration, when the abutting portion is pressed against the end portion of the partition wall, the seal member is deformed so that the cavity portion is crushed, and the space between the first passage and the second passage that are adjacent to each other is reliably sealed.

[18] A heat exchanger according to still another aspect is the heat exchanger of [17], in which the cavity portion (91) is composed of a plurality of small cavities.

With this configuration, when the abutting portion is pressed against the end portion of the partition wall, the seal member is deformed so that the cavity portion is crushed, and the space between the first passage and the second passage that are adjacent to each other is reliably sealed.

[19] A heat exchanger according to still another aspect is the heat exchanger of [16], in which the end portion (23a) of the partition wall (23) has a seal groove portion (110) recessed with respect to the end portion (23a). The seal groove portion (110) is defined by two inclined surfaces (110a, 110b) connected to each other at a bottom portion of the seal groove portion (110). The seal member (100) includes a deformable abutting portion (101). The abutting portion (101) is inserted in the seal groove portion (110) and abuts on each of the two inclined surfaces (110a, 110b).

With this configuration, when the abutting portion is pressed against the seal groove portion, the abutting portion is deformed and abuts on each of the two inclined surfaces, so that the space between the first passage and the second passage that are adjacent to each other can be reliably sealed.

[20] A heat exchanger according to still another aspect is the heat exchanger of [19], in which the abutting portion (101) has a J-shaped or L-shaped cross-sectional shape.

With this configuration, when the abutting portion is pressed against the seal groove portion, the abutting portion is deformed and abuts on each of the two inclined surfaces, so that the space between the first passage and the second passage that are adjacent to each other can be reliably sealed.

[21] A heat exchanger according to still another aspect is the heat exchanger of [20], in which the abutting portion (101) has a J-shaped cross-sectional shape and includes a portion with at least partially arcuate curved cross-sectional shape.

With this configuration, when the abutting portion is pressed against the seal groove portion, the abutting portion is deformed and abuts on each of the two inclined surfaces, so that the space between the first passage and the second passage that are adjacent to each other can be reliably sealed.

[22] A heat exchanger according to still another aspect is the heat exchanger of any of [19] to [21], in which the two inclined surfaces (110a, 110b) are surfaces having a curvature.

With this configuration, when the abutting portion is pressed against the seal groove portion, the abutting portion is deformed and abuts on each of the two inclined surfaces, so that the space between the first passage and the second passage that are adjacent to each other can be reliably sealed.

[23] A heat exchanger according to still another aspect is the heat exchanger of any of [1] to [22], in which the covering part (3) is detachably attached to the body part (2).

With this configuration, the metal powder remaining in the first passage and the second passage after additive manufacturing the body part can be easily removed. Further, the presence or absence of blockage in the first passage and the second passage can be easily confirmed after the use of the heat exchanger.

[24] A heat exchanger according to still another aspect is the heat exchanger of any of [1] to [23], in which a passage width of each of the first passage (21) and the second passage (22) is 3 mm or less.

Additive manufacturing is possible without a support when an overhang has a length of 3 mm or less. Therefore, if the passage width of each of the first passage and the second passage is 3 mm or less, in the case of forming ribs in each passage for strength reinforcement in additive manufacturing of the heat exchanger in a direction of extension of the first passage and the second passage, the length of the ribs becomes 3 mm or less, so that the ribs can be formed by additive manufacturing without a support.

[25] A heat exchanger according to still another aspect is the heat exchanger of any of [1] to [24], in which the body part (2) is an additive manufactured body of metal powder.

With this configuration, although the metal powder remains inside the first passage and the second passage after additive manufacturing the body part, since the first opening portion of the first passage and the second opening portion of the second passage are exposed, the remaining metal powder can be easily removed through the first opening portion and the second opening portion.

[26] A method of producing a heat exchanger according to one aspect is a method of producing a heat exchanger (1) for heat exchange between a first fluid and a second fluid, comprising: a step of additive manufacturing with metal powder a body part (2) which includes a first passage (21) through which the first fluid flows and a second passage (22) through which the second fluid flows and has a first opening portion (27) of the first passage (21) and a second opening portion (28) of the second passage (22); a step of removing the metal powder remaining inside the body part (2) through the first opening portion (27) and the second opening portion (28), after the step of additive manufacturing the body part (2); and a step of attaching a covering part (3) to the body part (2) so as to cover exposure of the first opening portion (27) and the second opening portion (28), after the step of removing the metal powder.

With the method of producing a heat exchanger of the present disclosure, although the metal powder of additive manufacturing remains inside the first passage and the second passage after additive manufacturing the body part, since the first opening portion of the first passage and the second opening portion of the second passage are exposed, the remaining metal powder can be easily removed through the first opening portion and the second opening portion.

[27] A method of producing a heat exchanger according to another aspect is the method of [26], comprising a step of confirming whether the metal powder remains inside the body part (2) through the first opening portion (27) and the second opening portion (28) between the step of removing the metal powder and the step of attaching the covering part (3).

With this producing method, although the metal powder of additive manufacturing remains inside the first passage and the second passage after additive manufacturing the body part, since the first opening portion of the first passage and the second opening portion of the second passage are exposed, the remaining metal powder can be easily removed through the first opening portion and the second opening portion.

[28] A method of producing a heat exchanger according to one aspect is a method of producing the heat exchanger of [15], comprising: a step of additive manufacturing the body part (2) with metal powder; a step of shaving each of the plurality of first closing walls (31) and each of the plurality of second closing walls (32) so as to be flush with each other on the first end surface (2b) and the second end surface (2c) of the body part (2), respectively; a step of removing the metal powder remaining inside the body part (2) through the first opening portion (27) and the second opening portion (28), after the step of additive manufacturing the body part (2); and a step of attaching the covering part (3) to the body part (2) so as to cover exposure of the first opening portion (27) and the second opening portion (28), after the step of removing the metal powder.

With this producing method, the plurality of first closing walls and the plurality of second closing walls can be easily made flush.

[29] A method of confirming blockage of a heat exchanger according to one aspect is a method of confirming blockage of the heat exchanger of [23], comprising: a step of detaching the covering part (3) from the body part (2) to expose the first opening portion (27) and the second opening portion (28); a step of identifying a blocked portion of the first passage (22) and the second passage (23) through the first opening portion (27) and the second opening portion (28), respectively; and a step of attaching the covering part (3) to the body part (2) so as to cover exposure of the first opening portion (27) and the second opening portion (28), after the step of identifying the blocked portion.

With the method of confirming blockage of the heat exchanger of the present disclosure, since the first opening portion of the first passage and the second opening portion of the second passage are exposed by detaching the covering part from the body part after the use of the heat exchanger, the presence or absence of blockage in the first passage and the second passage can be easily confirmed.

[30] A method of confirming blockage of the heat exchanger according to another aspect is the method of [29], comprising a step of removing blockage of the blocked portion, after the step of identifying the blocked portion.

With this blockage confirming method, it is possible to efficiently remove the blockage.

REFERENCE SIGNS LIST

1 Heat exchanger
2 Body part
2b First end surface (of body part)
2c Second end surface (of body part)
3 Covering part
3a Lid member
3a1 First lid
3a2 Second lid
4 First header passage
5 First header passage
6 Second header passage
7 Second header passage
21 First passage
21b First distribution passage
22 Second passage
22b Second distribution passage
23 Partition wall
23a End portion (of partition wall)
27 First opening portion
28 Second opening portion
31 First closing wall
32 Second closing wall
41 First header passage wall 42 First fixed wall
43 First separation wall
45 Second header passage wall
46 Second fixed wall
47 Second separation wall
50 Housing part
53a1 Groove demarcation wall (First separation wall)
53b1 Groove demarcation wall (Second separation wall)
53c1 Groove demarcation wall (First separation wall)
53d1 Groove demarcation wall (Second separation wall)
61 Groove portion
62 Groove portion
63 Seal member
64 Seal member
65 Ridge portion
65a Spring member (Ridge portion)
66 Ridge portion
66a Spring member (Ridge portion)
67 Flange portion
68 Flange portion
71 Inner seal member
72 Outer seal member
72a Notch
73 Inner seal member
74 Outer seal member
74a Notch
75 Storage part
76 First open/close valve
77 Second open/close valve
78 Control part
81 First seal member
82 Second seal member
90 Seal member
91 Cavity portion
92 Abutting portion
100 Seal member
101 Abutting portion
110 Seal groove portion
110a Inclined surface
110b Inclined surface
S Sensor (Detection part)

The invention claimed is:

1. A heat exchanger for heat exchange between a first fluid and a second fluid, the heat exchanger comprising:
a body part which is an additive manufactured body and includes at least one first passage through which the first fluid flows and at least one second passage through which the second fluid flows; and
a covering part attached to the body part,
wherein the body part has at least one first opening portion of the at least one first passage and at least one second opening portion of the at least one second passage, and the covering part is attached to the body part so as to cover exposure of the at least one first opening portion and the at least one second opening portion,
wherein the body part includes:
a first header passage through which the first fluid flows;
at least one first distribution passage connecting the first header passage and the at least one first passage;
a second header passage through which the second fluid flows; and
at least one second distribution, passage connecting the second header passage and the at least one second passage; and
a first fixed wall and a second fixed wall fixed to the body part,
wherein the at least one first opening portion is at least one opening portion of the at least one first distribution passage in the first fixed wall, the at least one second opening portion is at least one opening portion of the at least one second distribution passage in the second fixed wall,
wherein the heat exchanger includes a housing part into which the body part can be inserted,
wherein the first separation wall and the second separation wall are provided to the housing part, and
wherein when the body part is inserted into the housing part, the first separation wall and the second separation wall are attached to the first fixed wall and the second fixed wall, respectively.

2. The heat exchanger according to claim 1, wherein the covering part is detachably attached to the body part.

3. The heat exchanger according to claim 1, wherein a passage width of each of the first passage and the second passage is 3 mm or less.

4. The heat exchanger according to claim 1, wherein the body part is an additive manufactured body of metal powder.

5. A heat exchanger for heat exchange between a first fluid and a second fluid, the heat exchanger comprising:
a body part which is an additive manufactured body and includes at least one first passage through which the first fluid flows and at least one second passage through which the second fluid flows; and
a covering part attached to the body part,
wherein the body part has at least one first opening portion of the at lest one first passage and at least one second opening portion of the at lest one second passage, and the covering part is attached to the body part so as to cover exposure of the at least one first opening portion and the at least one second opening portion,
wherein the covering part includes a lid member attached to the body part so as to cover the at least one first opening portion and the at least one second opening portion,
wherein the covering part is attached to the body part via seal member between the covering part and the body part,
wherein the seal member includes:
an inner seal member disposed so as to surround at least one of the at least one first opening portion or the at least one second opening portion with the covering part being attached to the body part, and
an outer seal member disposed on an opposite side of the inner seal member from the at least one of the at least one first opening portion or the at least one second opening portion, and
wherein the outer seal member has notch with a distance in a direction of extension of the outer seal member,
wherein the body part has a storage part communicating with the notch and capable of storing the first fluid or the second fluid,
wherein the heat exchanger comprises a detection part for detecting inflow of the first fluid or the second fluid into the storage part,
wherein the heat exchanger comprises:
a first open/close valve for supplying the first fluid to the at least one first passage or stopping the supply of the first fluid;
a second open/close valve for supplying the second fluid to the at least one second passage or stopping the supply of the second fluid; and a control part electrically connected to the detection part, the first open/close valve, and the second open/close valve, and wherein the control part closes the first open/close valve and the second open/close valve when a signal indicating detection of inflow of the first fluid or the second fluid into the storage part is transmitted from the detection part.

6. The heat exchanger according to claim 5,
wherein the covering part is detachably attached to the body part.

7. The heat exchanger according to claim 5,
wherein a passage width of each of the first passage and the second passage is 3 mm or less.

8. The heat exchanger according to claim 5,
wherein the body part is an additive manufactured body of metal powder.

9. A heat exchanger for heat exchange between a first fluid and a second fluid, the heat exchanger comprising:
a body part which is an additive manufactured body and includes at least one first passage through which the first fluid flows and at least one second passage through which the second fluid flows; and
a covering part attached to the body part,
wherein the body part has at least one first opening portion of the at least one first passage and at least one second opening portion of the at lest one second passage, and the covering part is attached to the body part so as to cover exposure of the at least one first opening portion and the at least one second opening portion,
wherein the covering part includes a lid member attached to the body part so as to cover the at least one first opening portion and the at least one second opening portion,
wherein the first passage and the second passage that are adjacent to each other are separated by a partition wall,
wherein the lid member is provided with a seal member configured to be deformable by abutting on an end portion of the partition wall when the lid member is attached to the body part,
wherein the end portion of the partition wall has a seal groove portion recessed with respect to the end portion,
wherein the seal groove portion is defined by two inclined surfaces connected to each other at a bottom portion of the seal groove portion,
wherein the seal member includes a deformable abutting portion, and
wherein the abutting portion is inserted in the seal groove portion and abuts on each of the two inclined surfaces.

10. The heat exchanger according to claim 9,
wherein the abutting portion has a J-shaped or L-shaped cross-sectional shape.

11. The heat exchanger according to claim 10,
wherein the abutting portion has a J-shaped cross-sectional shape and includes a portion with at least partially arcuate curved cross-sectional shape.

12. The heat exchanger according to claim 9,
wherein the two inclined surfaces are surfaces having a curvature.

13. The heat exchanger according to claim 9,
wherein the covering part is detachably attached to the body part.

14. The heat exchanger according to claim 9,
wherein a passage width of each of the first passage and the second passage is 3 mm or less.

15. The heat exchanger according to claim 9,
wherein the body part is an additive manufactured body of metal powder.

* * * * *